(12) United States Patent
Horiuchi et al.

(10) Patent No.: US 8,828,604 B2
(45) Date of Patent: Sep. 9, 2014

(54) BATTERY

(75) Inventors: Hiroshi Horiuchi, Fukushima (JP);
Takehiko Tanaka, Fukushima (JP);
Masanori Soma, Tokyo (JP)

(73) Assignee: Sony Corporation (JP)

( * ) Notice: Subject to any disclaimer, the term of this patent is extended or adjusted under 35 U.S.C. 154(b) by 358 days.

(21) Appl. No.: 12/136,831

(22) Filed: Jun. 11, 2008

(65) Prior Publication Data

US 2008/0318124 A1    Dec. 25, 2008

(30) Foreign Application Priority Data

Jun. 20, 2007    (JP) ................. 2007-162185

(51) Int. Cl.
| H01M 4/134 | (2010.01) |
| H01M 4/62 | (2006.01) |
| H01M 4/13 | (2010.01) |
| H01M 10/0569 | (2010.01) |
| H01M 10/0525 | (2010.01) |
| H01M 4/60 | (2006.01) |

(52) U.S. Cl.
USPC ........... 429/212; 429/199; 429/324; 429/215; 429/218.1

(58) Field of Classification Search
USPC ................. 429/188–207, 209–246
See application file for complete search history.

(56) References Cited

U.S. PATENT DOCUMENTS

| 2003/0037458 | A1 | 2/2003 | Dedieu et al. | |
| 2003/0091892 | A1* | 5/2003 | Watanabe et al. | ............... 429/62 |
| 2003/0118912 | A1 | 6/2003 | Watanabe et al. | |
| 2003/0180626 | A1* | 9/2003 | Shima et al. | ................. 429/326 |
| 2003/0235762 | A1* | 12/2003 | Fukui et al. | .............. 429/231.95 |
| 2005/0074670 | A1* | 4/2005 | Azuma | ...................... 429/231.8 |
| 2006/0134528 | A1* | 6/2006 | Ihara et al. | ..................... 429/329 |
| 2006/0177742 | A1 | 8/2006 | Abe et al. | |
| 2007/0026311 | A1 | 2/2007 | Obana et al. | |
| 2007/0072074 | A1* | 3/2007 | Yamamoto et al. | ........... 429/200 |
| 2009/0092892 | A1* | 4/2009 | Yamaguchi et al. | .......... 429/125 |

FOREIGN PATENT DOCUMENTS

| JP | 07-302614 | 11/1995 |
| JP | 09-106835 | 4/1997 |
| JP | 09-171840 | 6/1997 |
| JP | 10-106579 | 4/1998 |
| JP | 10-275632 | 10/1998 |
| JP | 10-321258 | 12/1998 |
| JP | 11-162512 | 6/1999 |
| JP | 2000-156243 | 6/2000 |
| JP | 2001-023690 | 1/2001 |

(Continued)

OTHER PUBLICATIONS

Machine Translation of JP 2002298851 A.*

(Continued)

Primary Examiner — Jonathan Crepeau
Assistant Examiner — Jacob Buchanan
(74) Attorney, Agent, or Firm — Sheridan Ross P.C.

(57) ABSTRACT

A battery capable of ensuring storage characteristics and overcharge characteristics is provided. The battery comprising a cathode, an anode, and an electrolytic solution. The cathode has a cathode current collector and a cathode active material layer provided on the cathode current collector. The cathode active material layer includes an aromatic compound having three or more benzene rings. The electrolytic solution includes at least one of an ester carbonate containing a halogen and an ester carbonate containing an unsaturated bond.

6 Claims, 4 Drawing Sheets

(56) References Cited

FOREIGN PATENT DOCUMENTS

| | | | |
|---|---|---|---|
| JP | 2001-307736 | 11/2001 | |
| JP | 2002-117830 | 4/2002 | |
| JP | 2002-298851 | 10/2002 | |
| JP | 2002298851 A * | 10/2002 | ............ H01M 4/62 |
| JP | 2003-022838 | 1/2003 | |
| JP | 2004-063114 | 2/2004 | |
| JP | 2005-032701 | 2/2005 | |
| JP | 3778805 | 3/2006 | |
| JP | 2006-114285 | 4/2006 | |
| JP | 2006-309965 | 11/2006 | |
| WO | WO 2007136046 A1 * | 11/2007 | ............ H01M 4/131 |

OTHER PUBLICATIONS

Machine Translation of JP 2001-307736 (Nov. 2001).*

J. R Dahn et al.; Thermal stability of $LixCoO_2$, $LixNiO_2$ and A—$MnO_2$ and consequences for the safety of Li-ion cells; Solid State Ionics 69; 1994; 265-270.

Austrian Patent Office, Written Opinion and Search Report for application No. 200804152-7, mailed Dec. 22, 2009.

* cited by examiner

BATTERY

CROSS REFERENCES TO RELATED APPLICATIONS

The present invention contains subject matter related to Japanese Patent Application JP 2007-162185 filed in the Japanese Patent Office on Jun. 20, 2007, the entire contents of which being incorporated herein by reference.

BACKGROUND OF THE INVENTION

1. Field of the Invention

The present invention relates to a battery including a cathode, an anode, and an electrolytic solution.

2. Description of the Related Art

In recent years, portable electronic devices such as camera-integrated video tape recorders (VTR), mobile phones, and laptop personal computers have become widely popular. There is strong demand for reduction in size and weight and increase in life span of the portable electronic devices. In accordance with the demand, batteries, particularly lightweight secondary batteries having high energy density, are being developed as a power source for the portable electronic devices.

Most promising among the secondary batteries are a secondary battery using insertion and extraction of lithium for charge and discharge reaction (so-called lithium ion secondary battery) and a secondary battery using deposition and dissolution of lithium (so-called lithium metal secondary battery), because higher energy density is achieved compared to a lead battery and a nickel cadmium battery.

The secondary batteries described above have an electrolytic solution including a solvent and an electrolyte salt dissolved in the solvent. A mixed solvent that is a mixture of a high-permittivity solvent and a low-viscosity solvent is widely used as the solvent. High-permittivity solvents include, for example, ethylene carbonate and propylene carbonate that easily solvate with the electrolyte salt. Low-viscosity solvents include, for example, diethyl carbonate, dimethyl carbonate, and ethyl methyl carbonate that are superior in ionic conductivity. Regarding a composition of the electrolytic solution, solvent type, solvent mixture ratio, electrolyte salt type, electrolyte salt concentration, and the like are adjusted to improve electric conductivity.

When safety of the secondary battery is taken into account, in addition to electric conductivity, withstand voltage is an important characteristic demanded for the electrolytic solution. In other words, it is important that the secondary battery sufficiently endure even a state in which a high voltage and a high current exceeding standard values are applied.

Possible cases in which the high voltage and high current are applied are, for example: the case that a power supply circuit or a charger fails; the case that an electric charge that is equal to or more than a predetermined amount is applied as a result of misuse by a user, causing the secondary battery to become overcharged; and the case that a high current is applied because of an external short circuit, an internal short circuit, and the like. In the cases described above, the electrolytic solution is decomposed on an electrode surface, so gas and decomposition heat are generated. In this case, if the gas and the decomposition heat are continuously generated, the secondary battery may explode or ignite. In particular, lithium/transition metal complex oxides that are widely used as a cathode active material are known to become unstable oxides and release oxygen when the secondary battery is overcharged (for example, refer to Solid State Ionics 69, J. R Dahn, et al., 1994, page 265).

The electrolytic solution including the mixed solvent that is the mixture of the high-permittivity solvent and the low-viscosity solvent is advantageous for improvement of electric conductivity. However, because oxidation resistance is low, oxidative decomposition of the electrolytic solution easily occurs on the electrode surface when the secondary battery is overcharged. In this instance, when a lithium/transition metal complex oxide is used as the cathode active material, the secondary battery ignites with extreme heat generation, thereby increasing risk of so-called thermorunaway.

A technique in which an overcharge inhibitor is included in the electrolytic solution to improve safety when the secondary battery is overcharged, even if the above-described mixed solvent is used is known. Overcharge inhibitors include, for example, benzene, cyclohexylbenzene, t-pentylbenzene, terphenyl, anisole derivatives, biphenyl, 4,4'-dimethylbiphenyl, 3-R-thiophene, 3-chlorothiophene, furan, and non-ionic aromatic compounds including 2,2-diphenylpropane or an alkyl group (for example, refer to Japanese Unexamined Patent Application Publication Nos. H07-302614, H09-106835, H09-171840, H10-321258, H10-275632, H11-162512, 2000-156243, 2001-023690, 2003-022838, 2005-032701, and Japanese Patent No. 2939469).

A technique in which the overcharge inhibitor is included in the cathode instead of in the electrolytic solution is also known (for example, refer to Japanese Patent No. 3778805). In the technique, terphenyl is mixed with the cathode active material and included in a cathode active material layer.

SUMMARY OF THE INVENTION

However, even in the case where the overcharge inhibitor is included in the electrolytic solution or the cathode, the overcharge inhibitor is decomposed by oxidation-reduction reaction of the electrodes when the secondary battery is repeatedly charged and discharged. Therefore, characteristics of the secondary battery when the secondary battery is overcharged (referred to, hereinafter, as overcharge characteristics) tend to easily decrease. Moreover, while the overcharge inhibitor enhances safety when the secondary battery is overcharged, the overcharge inhibitor may cause decrease in discharge capacity and decrease in storage characteristics.

In view of the foregoing, in the invention, it is desirable to provide a battery capable of ensuring both storage characteristics and overcharge characteristics.

According to an embodiment of the invention, there is provided a battery including a cathode, an anode, and an electrolytic solution. The cathode has a cathode current collector and a cathode active material layer provided on the cathode current collector. The cathode active material layer includes an aromatic compound having three or more benzene rings. The electrolytic solution includes at least one of an ester carbonate containing a halogen and an ester carbonate containing an unsaturated bond.

In the battery according to an embodiment of the invention, the cathode active material layer includes an aromatic compound having three or more benzene rings, and the electrolytic solution includes at least one of an ester carbonate containing a halogen and an ester carbonate containing an unsaturated bond. As a result of a synergistic effect between the aromatic compound and the ester carbonate containing a halogen and the ester carbonate containing an unsaturated bond, overcharge inhibition function may be sustained even when the battery is repeatedly charged and discharged. Discharge capacity becomes less likely to decrease even after high temperature storage. Therefore, both storage characteristics and overcharge characteristics may be ensured.

DETAILED DESCRIPTION OF THE PREFERRED EMBODIMENT

Embodiments of the invention will be hereinafter described in detail with reference to the drawings.

First Embodiment

Figure 1:
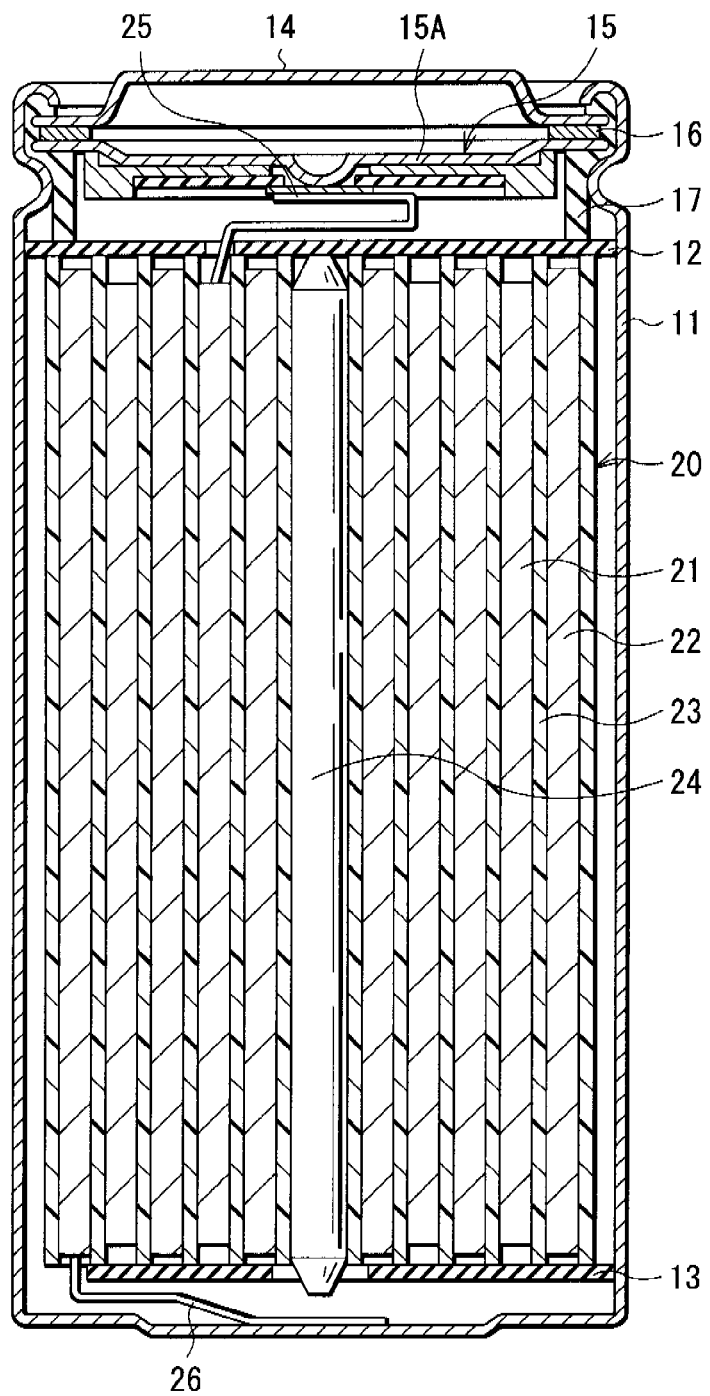
FIG. 1 is a cross-sectional view showing a structure of a battery according to a first embodiment of the invention.

FIG. 1 shows a cross-sectional structure of a battery according to a first embodiment of the invention. The battery is a lithium ion secondary battery in which the capacity of an anode is expressed based on insertion and extraction of lithium, the lithium serving as an electrode reactant.

In the secondary battery, a spirally wound electrode body 20 and a pair of insulating plates 12 and 13 are stored in a battery can 11. The battery can 11 is an almost hollow cylinder. Within the spirally wound electrode body 20, a cathode 21 and an anode 22 are spirally wound with a separator 23 in between. The battery can 11 is made of, for example, nickel (Ni)-plated iron (Fe). One end of the battery can 11 is closed and the other end thereof is opened. The pair of insulating plates 12 and 13 are disposed to sandwich the spirally wound electrode body 20 and to extend perpendicular to the circumferential surface of the spiral winding. The battery structure using the cylindrical battery can 11 is a so-called cylindrical-type structure.

A battery cover 14, a safety valve mechanism 15, and a positive temperature coefficient (PCT) device 16 are attached to the opened end of the battery can 11 by being caulked with a gasket 17. The safety valve mechanism 15 and the PCT device 16 are provided on the inner side of the battery cover 14. The interior of the battery can 11 is hermetically sealed. The battery cover 14 is made of, for example, a material similar to that of the battery can 11. The safety valve mechanism 15 is electrically connected to the battery cover 14 through the PTC device 16. In the safety valve mechanism 15, if internal pressure reaches a certain level or more because of an internal short circuit, heat from an external source, or the like, a disk plate 15A flips and cuts electric connection between the battery cover 14 and the spirally wound electrode body 20. Resistance in the PTC device 16 increases if temperature rises, thereby limiting a current. As a result, abnormal heat generation caused by a large current is prevented. The gasket 17 is made of, for example, an insulating material and its surface is coated with asphalt.

For example, a center pin 24 is inserted into the center of the spirally wound electrode body 20. In the spirally wound electrode body 20, a cathode lead 25 made of aluminum or the like is connected to the cathode 21. An anode lead 26 made of nickel or the like is connected to the anode 22. The cathode lead 25 is electrically connected to the battery cover 14 by being welded to the safety valve mechanism 15. The anode lead 26 is welded and thereby electrically connected to the battery can 11.

Figure 2:
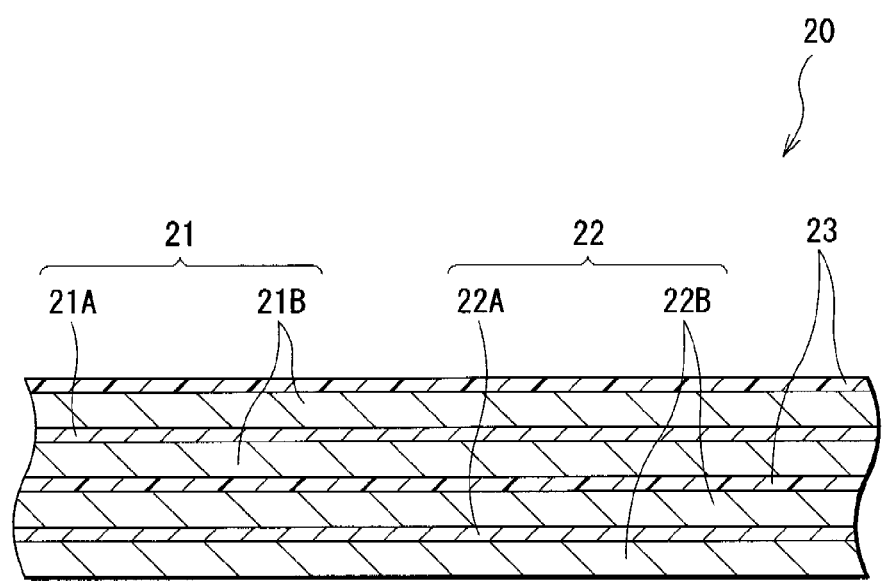
FIG. 2 is an enlarged cross-sectional view showing a portion of a spirally wound electrode body shown in FIG. 1.

FIG. 2 shows an enlarged view of a portion of the spirally wound electrode body 20 shown in FIG. 1. In the cathode 21, for example, a cathode active material layer 21B is provided on both surfaces of a cathode current collector 21A, the cathode current collector 21A having a pair of opposing surfaces. The cathode active material layer 21B may be provided on one surface of the cathode current collector 21A. The cathode current collector 21A is made of, for example, a metal material such as aluminum, nickel, or stainless steel. The cathode active material layer 21B contains a cathode active material and an aromatic compound. The cathode active material layer 21B may also contain electrical conductor, a binder, and the like, according to need.

The aromatic compound in the cathode active material layer 21B functions as an overcharge inhibitor and includes three or more benzene rings. When the aromatic compound has three or more benzene rings, the aromatic compound is not easily dissolved in an electrolytic solution. Therefore, elution of the aromatic compound into the electrolytic solution is suppressed. Because the aromatic compound is more easily retained in the cathode 21 as a result, the aromatic compound is not as easily consumed as when the aromatic compound is included in the electrolytic solution, even in the case that the electrolytic solution tends to be easily decomposed when the secondary battery is being charged and discharged. As a result, even when the secondary battery is repeatedly charged and discharged, an overcharge inhibition function of the aromatic compound is sustained. The aromatic compound may have a structure in which three or more adjacent benzene rings are bonded, such as that of anthracene. Alternatively, the aromatic compound may have a structure in which three or more benzene rings are spaced apart from each other and bonded, such as that of terphenyl. Moreover, the aromatic compound may have a structure that is a combination of both structures. In the case where a structural isomer is present in the aromatic compound, any structural isomer may be present. Regarding the above-described aromatic compounds, a combination of a plurality of types of compounds may be used.

It is particularly preferable that the aromatic compound has four or more benzene rings, because the elution of the aromatic compound into the electrolytic solution is further suppressed. As a result, higher effects may be achieved. An upper limit to the number of benzene rings the aromatic compound has may be arbitrarily set. However, if the aromatic compound has too many benzene rings, a molar ratio of the aromatic compound to the cathode active material decreases when, for example, content of aromatic compound in the cathode active material layer 21B is fixed based on a weight ratio. Therefore, a stable overcharge inhibition function may not be achieved. In terms of aromatic compound synthesis, when the number of benzene rings exceeds 10, synthesis becomes difficult to achieve and cost of synthesis is more likely to increase. Therefore, it is preferable that the upper limit of the number of benzene rings is, for example, about 10 or less. From the perspective of the shape of the cathode active material layer 21B, it is preferable that the upper limit is set such that the aromatic compound is dissolved by a solvent used when the cathode active material layer 21B is formed. However, the aromatic compound may not be dissolved. In the case where the number of benzene rings is set such that the aromatic compound is dissolved by the solvent, it is preferable that the number of benzene rings is, for example, about 10 or less.

The content of aromatic compound in the cathode active material layer 21B may be arbitrarily set. However, if the content is within a range from 0.05 wt % to 4 wt %, a sufficient overcharge inhibition function may be achieved. It is particularly preferable that the content of aromatic compound is within a range from 0.1 wt % to 3 wt %. As a result, prevention of discharge capacity reduction in storing at high temperature may be aided, while achieving the overcharge inhibition function. The above-described content of aromatic compound is a weight ratio to a remaining weight that is the weight of the aromatic compound subtracted from the total weight of the cathode active material layer 21B (the total weight of materials in the cathode active material layer 21B excluding the aromatic compound). For example, if the content of aromatic compound is 1 wt %, the weight ratio of the weight of the aromatic compound to the above-described remaining weight is 1 to 100.

The aromatic compound is, for example, o-terphenyl (o represents ortho position), m-terphenyl (m represents meta position), p-terphenyl (p represents para position), quaterphenyl, 2-methyl-p-terphenyl, 9,10-diphenyl-anthracene, 1,2,3,4-tetraphenylbenzene, 1,2,3,4-tetraphenylnaphthalene, 5,6,11,12-tetraphenylnaphthacene, or hexaphenylbenzene. The compounds may be used alone or in combination. Among the compounds, at least one of terphenyl and quaterphenyl is preferable because a sufficient overcharge inhibition function may be achieved. In this case, quaterphenyl is preferable because the aromatic compound is less easily dissolved by the electrolytic solution. It goes without saying that, as long as the aromatic compound has three or more benzene rings, the aromatic compound is not limited to the compounds above.

The cathode active material includes either one type or two or more types of cathode materials capable of inserting and extracting lithium serving as the electrode reactant. The cathode material capable of inserting and extracting lithium is, for example, lithium oxide, lithium sulfide, an intercalation compound including lithium, or a lithium-containing compound such as lithium phosphate compound. Among the materials above, a complex oxide including lithium and a transition metal element, or a phosphate compound including lithium and a transition metal element is preferable. In particular, a material that includes at least one type among cobalt (Co), nickel, manganese (Mn), iron, aluminum, vanadium (V), and titanium (Ti) as the transition-metal element is preferable. A chemical formula of the material is expressed as, for example, $Li_xMIO_2$ or $Li_yMIIPO_4$. In the formulas, MI and MII include one or more types of transition-metal elements. Values of x and y differ based on a charging and discharging state of the battery. Typically, $0.05 \leq x \leq 1.10$ and $0.05 \leq y \leq 1.10$.

Specific examples of the complex oxide including lithium and a transition-metal element are lithium cobalt complex oxide ($Li_xCoO_2$), lithium nickel complex oxide ($Li_xNiO_2$), lithium nickel cobalt complex oxide ($Li_xNi_{1-z}Co_zO_2$ (0<z<1)), lithium nickel cobalt manganese complex oxide ($Li_xNi_{(1-v-w)}Co_vMn_wO_2$ (0<v<1, 0<w<1, and v+w<1)), and lithium manganese complex oxide having a spinel structure ($LiMn_2O_4$). The complex oxide including lithium and a transition-metal element may also be, for example, a complex oxide in which a part of the transition-metal element included in the above-described complex oxide is substituted with another metal element (such as aluminum or magnesium (Mg)) or a core-shell type complex oxide having a lithium cobalt complex oxide core and a surface covered with a compound including nickel, manganese, fluorine or the like. Specific examples of the phosphate compound including lithium and a transition-metal element are lithium iron phosphate ($LiFePO_4$) compound and lithium iron manganese phosphate ($LiFe_{1-u}Mn_uPO_4$ (0<u<1)) compound.

The cathode material capable of inserting and extracting lithium may also be other metal compounds or polymers. The other metal compounds are, for example, oxides such as titanium oxide, vanadium oxide, and manganese dioxide, and disulfides such as titanium sulfide and molybdenum sulfide. The polymers are, for example, polyaniline and polythiophene.

The electrical conductor included in the cathode active material layer 21B is, for example, a carbon black, amorphous carbon particles, vapor-grown carbon, or a carbon nanotube. The carbon black is, for example, graphite particles and acetylene black. Amorphous carbon particles are, for example, needle coke. The binder is, for example: polyvinylidene fluoride; polytetrafluoroethylene; a copolymer using at least two types among vinylidene fluoride, chlorotrifluoroethylene, hexafluoropropylene, tetrafluoroethylene, and ethylene; ethylene-propylene-diene ternary copolymer; styrene-butadiene rubber; acrylonitrile-butadiene rubber; fluororubber; or a compound classified as an engineering plastic, such as polyimide resin.

The anode 22 has, for example, an anode active material layer 22B provided on both surfaces of an anode current collector 22A, the anode current collector 22A having a pair of opposing surfaces. The anode active material layer 22B may also be provided on one surface of the anode current collector 22A. The anode current collector 22A is preferably made of a material having favorable electrochemical stability, electric conductivity, and mechanical strength. The anode current collector 22A is preferably made of a metal material such as copper (Cu), nickel, or stainless steel. Among the materials, the anode current collector 22A is preferably made of copper because high electric conductivity is achieved. The anode active material layer 22B includes as an anode active material either one type or two or more types of anode materials capable of inserting and extracting lithium serving as the electrode reactant. The anode active material layer 22B may also include an electrical conductor, a binder, a viscosity modifier, or the like according to need. Charging capacity of the anode material capable of inserting and extracting lithium is preferably greater than the charging capacity of the cathode 21.

The anode material capable of inserting and extracting lithium is, for example, a material that may insert and extract lithium and has at least one of a metal element and a metalloid element as an element. Use of an anode material described above is preferable because high energy density is achieved. The anode material may be a simple substance, an alloy, or a compound of a metal element or a metalloid element. Alternatively, the anode material may have one or more phases thereof at least in part. The alloy in the invention includes an alloy containing one or more types of the metal elements and one or more types of the metalloid elements, in addition to an alloy composed of two or more metal elements. Moreover, the alloy in the invention may contain a nonmetallic element. A texture of the alloy may include a solid solution, a eutectic crystal (eutectic mixture), an intermetallic compound, or a coexistence of two or more types among the solid solution, the eutectic crystal (eutectic mixture), and the intermetallic compound.

The metal element or metalloid element composing the anode material is, for example, a metal element or a metalloid element capable of forming an alloy with lithium. Specifically, the metal element or metalloid element is magnesium, boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt), or the like. Among the elements, at least one of silicon and tin is particularly preferable. Because silicon and tin are highly capable of inserting and extracting lithium, high energy density is achieved.

An anode material containing at least one of silicon and tin is, for example: a simple substance, an alloy, or a compound of tin; a simple substance, an alloy, or a compound of silicon; or a material having one or more phases thereof at least in part. Each of the above may be used alone, or a plurality thereof may be used in combination.

An alloy of silicon is, for example, an alloy containing at least one type selected from the group consisting of tin, nickel, copper, iron, cobalt (Co), manganese (Mn), zinc, indium, silver, titanium (Ti), germanium, bismuth, antimony (Sb), and chromium (Cr) as a second element, in addition to silicon. An alloy of tin is, for example, an alloy containing at least one type selected from the group consisting of silicon, nickel, copper, iron, cobalt, manganese, zinc, indium, silver, titanium, germanium, bismuth, antimony, and chromium as a second element, in addition to tin.

A compound of silicon or a compound of tin is, for example, a compound containing oxygen or carbon. The above-described second element may be included in addition to silicon or tin.

In particular, the anode material containing at least one of silicon and tin is preferably, for example, an anode material having a second element and a third element, in addition to tin serving as a first element. The second element is at least one type selected from the group consisting of cobalt, iron, magnesium, titanium, vanadium (V), chromium, manganese, nickel, copper, zinc, gallium, zirconium, niobium (Nb), molybdenum (Mo), silver, indium, cerium (Ce), hafnium, tantalum (Ta), tungsten (W), bismuth, and silicon. The third element is at least one type selected from the group consisting of boron, carbon, aluminum, and phosphorus. Cycle characteristics is improved through inclusion of the second element and the third element.

The anode material is preferably a CoSnC-containing material. The CoSnC-containing material contains tin, cobalt, and carbon as elements. Carbon content in the CoSnC-containing material is within a range from 9.9 wt % to 29.7 wt %. A percentage of cobalt to the total of tin and cobalt (Co/(Sn+Co)) is within a range from 30 wt % to 70 wt %. In such a composition range, high energy density is achieved and superior cycle characteristics are achieved.

The CoSnC-containing material may further include other elements, according to need. The other elements are preferably, for example, silicon, iron, nickel, chromium, indium, niobium, germanium, titanium, molybdenum, aluminum, phosphorus, gallium, bismuth, and the like. The CoSnC-containing material may include two or more types of the above elements because capacitance characteristics or cycle characteristics is further improved.

The CoSnC-containing material has a phase including tin, cobalt, and carbon. The phase preferably has a low crystalline structure or an amorphous structure. In the CoSnC-containing material, at least a part of carbon serving an element is preferably bonded to a metal element or a metalloid element serving as another element. Deterioration of cycle characteristics may be considered to be caused by cohesion or crystallization of tin and the like. As a result of carbon bonding to the other element, such cohesion or crystallization may be suppressed.

In addition to the above-described anode materials, the anode material capable of inserting and extracting lithium is, for example, a carbon material. The carbon material is, for example, graphitizable carbon, non-graphitizable carbon, or graphite. In the carbon material, a change in a crystalline structure due to insertion and extraction of lithium is very small. Therefore, the carbon material is preferable because, for example, when the carbon material is used in combination with another anode material, high energy density is achieved and superior cycle characteristics are achieved. Moreover, the carbon material may also function as the electrical conductor.

The anode material capable of inserting and extracting lithium may also be, for example, a metal oxide or a polymer compound that is capable of inserting and extracting lithium. The anode materials may be used in combination with the above-described other anode materials. The metal oxide is, for example, iron oxide, ruthenium oxide, or molybdenum oxide. The polymer compound is, for example, polyacetylene, polyaniline, or polypyrrole.

The electrical conductor included in the anode active material layer 22B is, for example: graphite; petroleum or carboniferous coke; petroleum pitch; carboniferous pitch; resin carbide such as phenolic resin and crystalline cellulose; partially carbonized carbon material; furnace black; acetylene black; or carbon material such as pitch-based carbon fiber, PAN-based carbon fiber, graphite fiber, Ketjen black, vapor-grown carbon, and carbon nanotube. The materials may be used alone, or a plurality of materials may be used in combination. A metal material, a conductive polymer, or the like may be used as long as the material has electric conductivity. The binding included in the anode active material layer 22B is, for example, a material similar to that used in the cathode active material layer 21B. The viscosity modifier is, for example, carboxymethyl cellulose.

The separator 23 separates the cathode 21 and the anode 22. The separator 23 allows lithium ions to pass while preventing current short circuit caused by contact between both electrodes. The separator 23 is made of, for example, a porous film made of a synthetic resin such as polytetrafluoroethylene, polypropylene, and polyethylene, or a ceramic porous film. The separator 23 may have a structure in which two or more types of the above-described porous films are layered. Among the porous films, a porous film made of polyolefin is preferable because the porous film is highly effective for preventing short circuits and safety of the battery attributed to a shutdown effect is improved. In particular, polyethylene is preferable because the shutdown effect may be achieved at a temperature within a range from 100° C. to 150° C. Polyethylene also has superior electrochemical stability. Polypropylene is also preferable. In addition, resin that is copolymerized with polyethylene or polypropylene, or blended with polyethylene or polypropylene may be used, as long as the resin has chemical stability.

In particular, the surface of the separator 23 is preferably coated with a polymer compound, such as a copolymer of hexafluoropropylene and polyvinylidene fluoride or hexafluoropropylene and vinylidene fluoride. Because adhesion to the electrodes improves, internal resistance decreases. Other than the polymer compounds described above, the polymer compound may be, for example: polytetrafluoroethylene; a copolymer using at least two types among vinylidene fluoride, chlorotrifluoroethylene, hexafluoropropylene, tetrafluoroethylene, and ethylene; ethylene-propylene-diene ternary copolymer; styrene-butadiene rubber; acrylonitrile-butadiene rubber; fluororubber; or a compound classified as an engineering plastic, such as polyimide resin. The above-described polymer compounds may be used alone, or a plurality thereof may be used in combination. A material having a high heat capacity, such as aluminum oxide (alumina) may be combined with the above-described polymer compounds and used.

The separator 23 is impregnated with the electrolytic solution serving as a liquid electrolyte. The electrolytic solution contains, for example, a solvent and an electrolyte salt dissolved in the solvent.

The solvent includes at least one of an ester carbonate containing a halogen and an ester carbonate containing an unsaturated bond. A coating is formed on the surfaces of the cathode 21 and the anode 22. Therefore, decomposition of the electrolytic solution is suppressed and discharge capacity does not easily decrease even under high temperature storage. In particular, the above-described coating suppresses decomposition of the aromatic compound included in the cathode 21, in addition to the decomposition of the electrolytic solution. In this case, when a part of the aromatic compound also similarly forms a coating, the coating formed on the surface of the cathode 21 becomes more solid. Therefore, decomposition of the electrolytic solution and aromatic compound is further suppressed. As a result, the discharge capacity becomes less likely to decrease, and the overcharge inhibition function is further sustained even if the battery is repeatedly charged and discharged. Moreover, when the aromatic compound is used in combination with the ester carbonate containing a halogen and the ester carbonate containing an unsaturated bond, the discharge capacity becomes significantly less likely to decrease as a result of a synergistic effect of the combination, even if an aromatic compound is included that, when alone, causes decrease in discharge capacity.

The ester carbonate containing halogen preferably includes fluorine as the halogen. A more solid coating is formed, compared to the case that other halogens are included.

An ester carbonate containing fluorine is, for example, a cyclic carbonate or a chain carbonate. The cyclic carbonate is 4-fluoro-1,3-dioxolane-2-one, 4,5-difluoro-1,3-dioxolane-2-one, 4,4,5-tetrafluoro-1,3-dioxolane-2-one, 4,4,5,5-tetrafluoro-1,3-dioxolane-2-one, 4-difluoromethyl-1,3-dioxolane-2-one, or the like. The chain carbonate is fluoromethyl methyl carbonate, ethyl (2-fluoroethyl) carbonate, methyl (2-fluoroethyl) carbonate, bis (2-fluoroethyl) carbonate, fluoropropyl methyl carbonate, or the like. The ester carbonates may be used alone, or a plurality thereof may be used in combination. Among the ester carbonates, at least one of 4-fluoro-1,3-dioxolane-2-one, and 4,5-difluoro-1,3-dioxolane-2-one is preferable because a sufficiently solid coating is formed. In this case, 4,5-difluoro-1,3-dioxolane-2-one is preferable because 4,5-difluoro-1,3-dioxolane-2-one is readily available and forms a more solid coating. In particular, the 4,5-difluoro-1,3-dioxolane-2-one is preferably a trans isomer rather than a cis isomer.

A ester carbonate containing an unsaturated bond is, for example, vinylene carbonate, vinylene (4,5-diphenyl) carbonate, vinylethylene carbonate, arylmethyl carbonate, or diallyl carbonate. The ester carbonates may be used alone, or a plurality thereof may be used in combination. Among the ester carbonates, vinylene carbonate is preferable because a sufficiently solid coating is formed.

The solvent may include another solvent (for example, a nonaqueous solvent such as an organic solvent) with at least one of the above-described ester carbonate containing a halogen and ester carbonate containing an unsaturated bond. Other solvents are, for example, cyclic ester carbonates, chain ester carbonates, cyclic esters, chain esters, cyclic ethers, chain ethers, organic solvents containing sulfur (S) as an element, nitrites, and carbamates.

The cyclic ester carbonates are, for example, ethylene carbonate, propylene carbonate, butylene carbonate, and 4,5-diphenyl-1,3-dioxolane-2-one. The chain ester carbonates are, for example, dimethyl carbonate, diethyl carbonate, ethylmethyl carbonate, dipropyl carbonate, diisopropyl carbonate, dibutyl carbonate, and di-t-butyl carbonate. The cyclic esters are, for example, γ-butyrolactone and γ-valerolactone. The chain esters are, for example, methyl acetate, ethyl acetate, propyl acetate, methyl propionate, and ethyl propionate. The cyclic ethers are, for example, tetrahydrofuran, 2-methyltetrahydrofuran, tetrahydropyran, 1,3-dioxolan, 4-methyl-1,3-dioxolan, 1,3-dioxane, 4-methyl-1,3-dioxane, and 1,3-benzodioxole. The chain ethers are, for example, 1,2-dimethoxyethane, 1,2-diethoxyethane, diglyme, triglyme, tetraglyme, and diethyl ether. The organic solvents containing sulfur as an element are, for example, ethyl sulfite, propane sultone, sulfolane, methyl sulfolane, and diethyl sulfine. The nitriles are, for example, acetonitrile and propionitrile. The carbamates are, for example, N,N'-dimethyl carbamate and N,N'-diethyl carbamate. The other solvents may be used alone, or a plurality thereof may be used in combination.

Among the solvents, at least one type selected from the group consisting of ethylene carbonate, propylene carbonate, dimethyl carbonate, diethyl carbonate, and ethylmethyl carbonate is preferable. In this case, a mixture of a high-viscosity (high dielectric) solvent (for example, a relative dielectric constant of $\in \geq 30$), such as ethylene carbonate or propylene carbonate, and a low-viscosity solvent (for example, viscocity$\leq 1$ mPa·s), such as dimethyl carbonate, ethylmethyl carbonate, or diethyl carbonate, is particularly preferable because dissociation and ionic conductivity of the electrolyte salt are improved.

The electrolyte salt includes, for example, one type or two or more types of any light metal salts such as a lithium salt. The lithium salt is, for example, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium hexafluoroantimonate ($LiSbF_6$), lithium trifluoromethanesulfonate ($LiCF_3SO_3$), lithium bis(trifluoromethanesulfonyl)imide ($LiN(CF_3SO_2)_2$), lithium tris(trifluoromethanesulfonyl)methide ($LiC(CF_3SO_2)_3$), lithium bis(pentafluoroethanesulfonyl)imide ($LiN(C_2F_5SO_2)_2$), lithium chloride (LiCl), lithium bromide (LiBr), lithium iodide (LiI), lithium tetraphenyl borate ($LiB(C_6H_5)_4$), lithium bis(trifluoromethyl) tetrafluorophosphate ($LiPF_4(CF_3)_2$), lithium tris (pentafluoroethyl) trifluorophosphate ($LiPF_3(C_2F_5)_3$), lithium tris (trifluoromethyl) triflurophosphate ($LiPF_3(CF_3)_3$), lithium tris(septafluoroisopropyl) trifluorophosphate ($LiPF_3(iso-C_3F_7)_3$), lithium (septafluoroisopropyl) hexafluorophosphate ($LiPF_5(iso-C_3F_7)$), lithium bis[oxalate-O,O'] borate, or lithium difluoro[oxalate-O,O'] borate. The lithium salts may be used alone, or plurality thereof may be used in combination. Among the lithium salts, lithium hexafluorophosphate is preferable because internal resistance decreases.

Concentration of the electrolyte salt in the electrolytic solution is preferably within a range from 0.3 mol/kg to 3.0 mol/kg, and more preferably within a range from 0.5 mol/kg to 1.5 mol/kg. If the concentration is out of the range, ionic conductivity significantly deteriorates. Therefore, capacitance characteristics and the like may not be sufficiently achieved.

The secondary battery is fabricated, for example, by the following procedure.

First, the cathode 21 is formed by forming, for example, the cathode active material layer 21B on both surfaces of the cathode current collector 21A. When the cathode active material layer 21B is formed, a cathode active material, an aromatic compound, an electrical conductor, and a binder are mixed to prepare a cathode mixture. The cathode mixture is dispersed in a solvent, forming paste-like cathode mixture slurry. The cathode current collector 21A is coated with the cathode mixture slurry. After the cathode mixture slurry is dried, compression molding is performed. The anode 22 is formed by, forming for example, the anode active material layer 22B on both surfaces of the anode current collector 22A by a procedure similar to that for the cathode 21.

Next, the cathode lead 25 is attached to the cathode current collector 21A by welding. The anode lead 26 is attached to the anode current collector 22A by welding. The cathode 21 and the anode 22 are then spirally wound with the separator 23 in between, thereby forming the spirally wound electrode body 20. A tip of the cathode lead 25 is welded onto the safety valve mechanism 15. A tip of the anode lead 26 is welded onto the battery can 11. Subsequently, the spirally wound electrode body 20 is sandwiched between a pair of insulating plates 12 and 13, and the spirally wound electrode body 20 and the pair of insulating plates 12 and 13 are housed in the battery can 11. Next, an electrolyte salt is dissolved in a solvent including at least one of the ester carbonate containing a halogen and the ester carbonate containing an unsaturated bond. As a result, the electrolytic solution is prepared. The electrolytic solution is then injected into the battery can 11. The electrolytic solution impregnates the separator 23. Finally, the battery cover 14, the safety valve mechanism 15, and the PCT device 16 are fixed onto the opening end of the battery can 11 by being caulked with the gasket 17. As a result, the secondary battery shown in FIG. 1 and FIG. 2 is fabricated.

When the secondary battery is charged, for example, lithium ions are extracted from the cathode 21. The lithium ions are then inserted into the anode 22 through the electrolytic solution. On the other hand, when the battery is discharged, the lithium ions are extracted from the anode 22. The lithium ions are then inserted into the cathode 21 through the electrolytic solution.

In the secondary battery, in the case where the capacity of the anode 22 is expressed based on the insertion and extraction of lithium, the cathode active material layer 21B of the cathode 21 includes an aromatic compound having three or more benzene rings, and the electrolytic solution includes at least one of the ester carbonate containing a halogen and the ester carbonate containing an unsaturated bond. In this case, because the aromatic compound functions as the overcharge inhibitor, the overcharge characteristics improve. In addition, because the ester carbonate containing a halogen and the ester carbonate containing an unsaturated bond form a coating on the surfaces of the cathode 21 and the anode 22 and decomposition of the electrolytic solution is suppressed, the storage characteristics are improved. In particular, because the above-described coating suppresses decomposition of the aromatic compound, in addition to decomposition of the electrolytic solution, the overcharge inhibition function is sustained even if the secondary battery is repeatedly charged and discharged. The overcharge characteristics are significantly improved. As a result of the synergetic action by the combination of the aromatic compound with the ester carbonate containing a halogen and the ester carbonate containing an unsaturated bond, the discharge capacity becomes significantly less likely to decrease even under high temperature storage, regardless of the aromatic compound being included that, when alone, causes decrease in discharge capacity. Therefore, the storage characteristics significantly improve. Moreover, when the aromatic compound is included in the cathode, decomposition of the aromatic compound is less likely to occur when the battery is being charged and discharged, compared to the case that the aromatic compound is included in the electrolytic solution. As a result, the storage characteristics are improved. Therefore, because the storage characteristics and the overcharge characteristics are both improved, both storage characteristics and overcharge characteristics may be ensured.

In particular, if the content of aromatic compound in the cathode active material layer 21B is within a range from 0.1 wt % to 3 wt %, the discharge capacity becomes further less likely to decrease. Therefore, the storage characteristics may be further improved.

Next, second and third embodiments will be described. Elements that are the same as those according to the first embodiment are given the same reference numbers. Explanations thereof are omitted.

Second Embodiment

A battery according to the second embodiment has a structure, an operation, and an effect similar to those according to the first embodiment, except that the anode 22 has a different structure. The battery according to the second embodiment is also fabricated by a procedure similar to that according to the first embodiment.

Like the battery according to the first embodiment, the anode 22 has the anode active material layer 22B provided on both surfaces of the anode current collector 22A. The anode active material layer 22B includes, for example, a material containing silicon or tin as an element, the material serving as the anode active material. Specifically, the material contains a simple substance, an alloy, or a compound of silicon, or a simple substance, an alloy, or a compound of tin. The material may contain two types or more of the above.

The anode active material layer 22B is formed using a vapor-phase deposition method, liquid-phase deposition method, spraying method, firing method, or a combination of two or more methods. The anode active material layer 22B and the anode current collector 22A are preferably alloyed at at least a portion of an interface therebetween. Specifically, it is preferable that the element of the anode current collector 22A is diffused in the anode active material layer 22B, at the interface therebetween. Alternatively, the element of the anode active material layer 22B is diffused in the anode current collector 22A. Alternatively, the elements of the anode active material layer 22B and the anode current collector 22A are mutually diffused. As a result, damage caused by expansion and shrinkage of the anode active material layer 22B, due to charging and discharging, may be suppressed. Electric conductivity between the anode active material layer 22B and the anode current collector 22A may be improved.

The vapor-phase deposition method is, for example, a physical deposition method or a chemical deposition method. Specifically, the vapor-phase deposition method is a vacuum evaporation method, a sputtering method, an ion plating method, a laser ablation method, a thermal chemical vapor deposition (CVD) method, a plasma CVD method, or the like. As the liquid-phase deposition method, a known technique such as electrolytic plating and electroless plating may be used. The firing method is, for example, a method in which a particulate anode active material mixed with a binder or the like is dispersed in a solvent and applied onto the anode current collector. Heat treatment is then performed at a temperature higher than a melting point of the binder or the like.

A known technique, such as an atmosphere firing method, a reactive firing method, or a hot press firing method, may also be used as the firing method.

Third Embodiment

A battery according to the third embodiment is a lithium metal secondary battery in which the capacity of the anode 22 is expressed by deposition and dissolution of lithium. The battery according to the third embodiment has a structure similar to that according to the first embodiment, except that the anode active material layer 22B is made of a lithium metal. The battery according to the third embodiment is also fabricated by a procedure similar to that according to the first embodiment.

In the secondary battery, lithium metal is used as the anode active material. As a result, high energy density may be achieved. The anode active material layer 22B may be already provided at assembly. However, the anode active material layer 22B may not be present at assembly, but rather formed by lithium metal deposited when the secondary battery is charged. The anode active material layer 22B may also be used as a current collector, thereby allowing the anode current collector 22A to be omitted.

When the secondary battery is charged, for example, lithium ions are extracted from the cathode 21. The lithium ions are then deposited onto the surface of the anode current collector 22A as lithium metal through the electrolytic solution. On the other hand, when the secondary battery is discharged, the lithium metal dissolves from the anode active material layer 22B as the lithium ions. The lithium ions are then inserted into the cathode 21 through the electrolytic solution.

In the secondary battery, when the capacity of the anode 22 is expressed based on the deposition and dissolution of lithium, the cathode active material layer 21B of the cathode 21 has an aromatic compound including three or more benzene rings. The electrolytic solution includes at least one of an ester carbonate containing a halogen and an ester carbonate containing an unsaturated bond. Therefore, both storage characteristics and overcharge characteristics may be ensured. Other effects related to the secondary battery are similar to those of the secondary battery according to the first embodiment.

Fourth Embodiment

Figure 3:
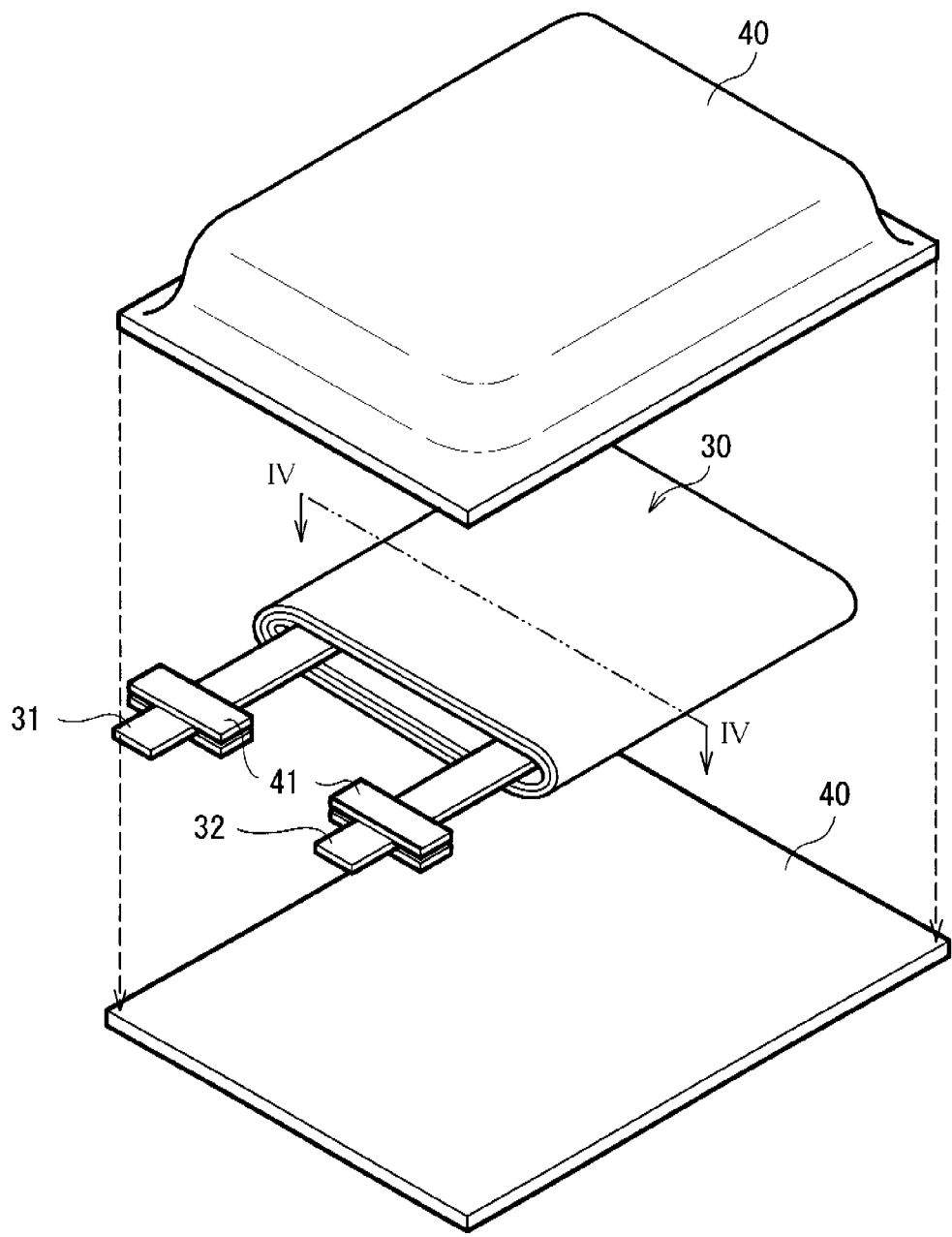
FIG. 3 is an exploded perspective view showing a structure of a battery according to a fourth embodiment of the invention.

FIG. 3 shows an exploded perspective structure of a battery according to a fourth embodiment. In the battery, a cathode lead 31 and an anode lead 32 are attached to a spirally wound electrode body 30. The spirally wound electrode body 30 is housed in a film-like package member 40. The battery structure using the film-like package member 40 is a so-called laminated structure.

The cathode lead 31 and the anode lead 32 are, for example, respectively directed from inside to outside of the package member 40 in the same direction. The cathode lead 31 is made of, for example, a metal material such as aluminum. The anode lead 32 is made of, for example, a metal material such as copper, nickel, or stainless steel. The cathode lead 31 and the anode lead 32 are in the shape of a thin plate or mesh.

The package member 40 is made of a rectangular aluminum laminated film in which, for example, a nylon film, an aluminum foil, and a polyethylene film are sequentially bonded together. In the package member 40, for example, the polyethylene film faces the spirally wound electrode body 30. Each outer edge is bonded to each other by fusion bonding or an adhesive. An adhesive film 41 is inserted between the package member 40 and the cathode lead 31 and between the package member 40 and the anode lead 32. The adhesive film 41 prevents entering of outside air. The adhesive film 41 is made of a material allowing adhesion with the cathode lead 31 and the anode lead 32. The material is, for example, a polyolefin resin such as polyethylene, polypropylene, modified polyethylene, or modified polypropylene.

The package member 40 may include a laminated film having different structure, instead of the above-described aluminum laminated film having the three-layer structure. Alternatively, the package member 40 may be made of a polymer film, such as polypropylene, or a metal film.

Figure 4:
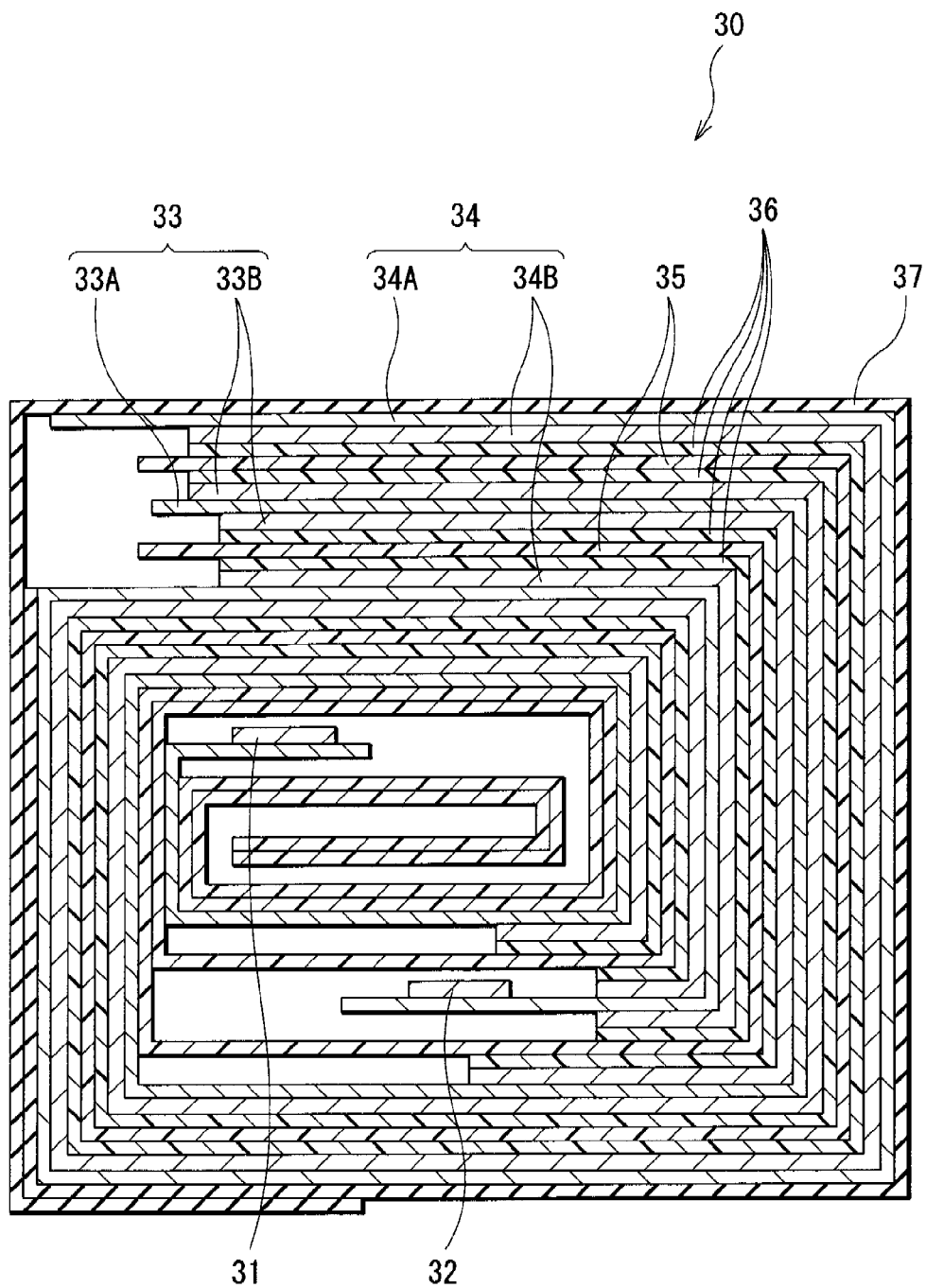
FIG. 4 is a cross-sectional view showing a structure of a spirally wound electrode body shown in FIG. 3, taken along line IV-IV.

FIG. 4 shows a cross-sectional structure of the spirally wound electrode body 30 shown in FIG. 3, taken along line IV-IV. In the spirally wound electrode body 30, the cathode 33 and the anode 34 are layered with a separator 35 and an electrolyte 36 in between. The cathode 33 and the anode 34 are then spirally wound. An outermost periphery of the spirally wound electrode body 30 is protected by a protective tape 37.

In the cathode 33, the cathode active material layer 33B is provided on both surfaces of the cathode current collector 33A. In the anode 34, the anode active material layer 34B is provided on both surfaces of the anode current collector 34A. The anode active material layer 34B is disposed facing the cathode active material layer 33B. Structures of the cathode current collector 33A, the cathode active material layer 33B, the anode current collector 34A, the anode active material layer 34B, and the separator 35 are similar to those of the cathode current collector 21A, the cathode active material layer 21B, the anode current collector 22A, the anode active material layer 22B, and the separator 23 in the battery according to the first to third embodiments.

The electrolyte 36 is in a so-called gelatinous state. The electrolyte 36 includes the electrolytic solution and a polymer compound that holds the electrolytic solution. A gel electrolyte is preferable because high ionic conductivity (for example, 1 mS/cm or more at room temperature) is achieved and liquid leakage is prevented.

The polymer compound is, for example: polyacrylonitrile; polyvinylidene fluoride; a copolymer of polyvinylidene fluoride and polyhexafluoropropylene; polytetrafluoroethylene; polyhexafluoropropylene; polyethylene oxide; polypropylene oxide; polyphosphazene; polysiloxane; polyvinyl acetate; polyvinyl alcohol; polymethacrylic acid methyl; polyacrylic acid; polymethacrylic acid; styrene-butadiene rubber; nitrile-butadiene rubber; polystyrene; or polycarbonate. The polymer compounds may be used alone, or a plurality thereof may be used in combination. In terms of electrochemical stability, use of polyacrylonitrile, polyvinylidene fluoride, polyhexafluoropropylene, or polyethylene oxide is particularly preferable. Amount of polymer compound added to the electrolytic solution differs based on compatibility. However, for example, an amount within a range from 5 wt % to 50 wt % is preferable.

A composition of the electrolytic solution is similar to that in the battery according to the first embodiment. However, a solvent in this case means a wide concept including, in addition to a liquid solvent, a solvent having ionic conductivity that may allow dissociation of the electrolyte salt. Therefore, when a polymer compound having ionic conductivity is used, the polymer compound is also included in the solvent.

The electrolytic solution may be used as is, instead of the electrolyte 36 in which the electrolytic solution is held by the polymer compound. In this case, the separator 35 is impregnated with the electrolytic solution.

The secondary battery may be fabricated by, for example, three kinds of fabricating methods described below.

In a first fabricating method, first, for example, a procedure similar to that of the fabricating method of the battery according to the first embodiment is used. The cathode active material layer 33B is formed on both surfaces of the cathode current collector 33A, thereby forming the cathode 33. The anode active material layer 34B is formed on both surfaces of the anode current collector 34A, thereby forming the anode 34.

Next, a precursor solution including the electrolytic solution, the polymer compound, and the solvent is prepared. The cathode 33 and the anode 34 are coated with the precursor solution. The solvent is then volatilized. As a result, the gel electrolyte 36 is formed. Next, the cathode lead 31 is attached to the cathode current collector 33A. The anode lead 32 is attached to the anode current collector 34A. The cathode 33 and the anode 34, on which the electrolyte 36 is provided, are laminated with the separator 35 in between. The laminated cathode 33 and anode 34 are spirally wound in a longitudinal direction. The protective tape 37 is adhered to the outermost periphery of the laminated cathode 33 and anode 34. As a result, the spirally wound electrode body 30 is formed. Next, the spirally wound electrode body 30 is, for example, sandwiched between two film-like package members 40. The outer edges of the package members 40 are bonded together by thermal fusion bonding or the like, thereby enclosing the spirally wound electrode body 30. At this time, the adhesive film 41 is inserted between the cathode lead 31 and the package member 40 and between the anode lead 32 and the package member 40. As a result, the secondary battery shown in FIG. 3 and FIG. 4 is fabricated.

In a second fabricating method, first, the cathode lead 31 and the anode lead 32 are respectively attached to the cathode 33 and the anode 34. The cathode 33 and the anode 34 are laminated with the separator 35 in between. The laminated cathode 33 and anode 34 are spirally wound. The protective tape 37 is adhered to the outermost periphery of the laminated cathode 33 and anode 34. As a result, a spirally wound body that is a precursor of the spirally wound electrode body 30 is formed. Next, the spirally wound body is sandwiched between two film-like package members 40. The outer edges of the package members 40, excluding an outer edge of one side, are then bonded together by thermal fusion bonding or the like. The spirally wound body is housed in a pouch-like packaging member 40. Next, a composition of matter for electrolyte is prepared, the composition containing the electrolytic solution, a monomer serving as a base material for the polymer compound, a polymerization initiator, and, if necessary, other materials such as a polymerization inhibitor. The composition is injected into the pouch-like package member 40. The opening of the package member 40 is then sealed by thermal fusion bonding or the like. Finally, the monomer is thermally polymerized, thereby forming the polymer compound. Thus, the gel electrolyte 36 is formed. As a result, the secondary battery is fabricated.

As in the above-described first method, in a third method, a spirally wound body is formed and housed in the pouch-like package member 40. However, the third method differs from the first method in that the separator 35 of which both surfaces are coated with the polymer compound is used. The polymer compound applied onto the separator 35 is, for example, a polymer having vinylidene fluoride as an element, the polymer being, in other words, a single polymer, a copolymer, or a multicomponent copolymer. Specifically, the polymer compound is, for example, polyvinylidene fluoride, a binary copolymer, or a ternary copolymer. Elements in the binary copolymer are vinylidene fluoride and hexafluoropropylene. Elements in the ternary copolymer are vinylidene fluoride, hexafluoropropylene, and chlorotrifluoroethylene. The polymer compound may include one type or two or more types of other polymer compounds in addition to the above-described polymer having vinylidene fluoride as an element. Next, the electrolytic solution is prepared and injected into the package member 40. The opening of the package member 40 is then sealed by thermal fusion bonding or the like. Finally, the package member 40 is heated while a load is applied to the package member 40. The separator 35 is adhered to the cathode 33 and the anode 34 by the polymer compound. As a result, the electrolytic solution impregnates the polymer compound. The polymer compound becomes gelatinous, and the electrolyte 36 is formed. As a result, the secondary battery is fabricated. In the third fabricating method, swelling characteristics are improved, compared to the first fabricating method. In the third fabricating method, compared to the second fabricating method, only slight amounts of the monomer that is the base material of the polymer compound, the solvent, and the like remain in the electrolyte 36, and a formation procedure for the polymer compound is favorably controlled. Therefore, sufficient bonding is achieved among the cathode 33, the anode 34, the separator 35, and the electrolyte 36.

Operations and effects of the laminated-type secondary battery are the same as those of the secondary battery according to the first embodiment.

Examples

Specific examples of the invention will be described in detail.

Example 1-1

The laminated-film secondary battery shown in FIG. 3 and FIG. 4 was fabricated using silicon as the anode active material. The secondary battery was fabricated as a lithium ion secondary battery in which the capacity of the anode 34 is expressed based on insertion and extraction of lithium.

The cathode 33 was formed first. First, lithium carbonate ($Li_2CO_3$) and cobalt carbonate ($CoCO_3$) were mixed with a molar ratio of 0.5:1. The mixture was then fired in the air for 5 hours at 900° C., thereby obtaining lithium cobalt complex oxide ($LiCoO_2$). Subsequently, 91 parts by weight of the lithium cobalt complex oxide serving as the cathode active material, 6 parts by weight of graphite serving as the electrical conductor, 3 parts by weight of polyvinylidene fluoride serving as the binder, and 0.1 part by weight (content in the cathode active material layer 33B=0.1 wt %) of o-terphenyl (o-TP) serving as the aromatic compound were mixed to obtain a cathode mixture. The cathode mixture was then dispersed in N-methyl-2-pyrrolidone to obtain paste-like cathode mixture slurry. The cathode current collector 33A, made of a strip-shaped aluminum foil (thickness of 20 μm), was evenly coated with the cathode mixture slurry. After the cathode mixture slurry had dried, the cathode current collector 33A was compression-molded by a roll-pressing machine. As a result, the cathode active material layer 33B was formed.

Next, silicon was deposited on both surfaces of the anode current collector 34A by the electron beam evaporation method, the anode current collector 34A being made of an electrolytic copper foil having an arithmetic mean roughness Ra of 0.5 μm (thickness of 15 μm). The silicon was heated and then dried in a vacuum, thereby forming the anode active material layer 34B. As a result, the anode 34 was formed.

Next, the electrolytic solution was prepared. In this case, ethylene carbonate (EC), diethyl carbonate (DEC), and 4-fluoro-1,3-dioxolane-2-one (FEC) were mixed to serve as the solvent. 4-fluoro-1,3-dioxolane-2-one is the ester carbonate containing a halogen. Lithium hexafluorophosphate ($LiPF_6$) serving as the electrolyte salt was then dissolved in the solvent. At that time, the composition of the solvent (EC:DEC:FEC) had a weight ratio of 20:50:30. The concentration of $LiPF_6$ in the electrolytic solution was 1 mol/kg.

Next, the cathode lead 31 was attached to one end of the cathode current collector 33A. The anode lead 32 was attached to one end of the anode current collector 34A. Then, the cathode 33, the separator 35 (thickness of 16 μm) of which both surfaces had been coated with polyvinylidene fluoride, and the anode 34 were sequentially layered. The laminated cathode 33, separator 35, and anode 34 were then wound many times in a spiral form in a longitudinal direction. Subsequently, the end of the winding was fixed by the protective tape 37 made of an adhesive tape. As a result, the spirally wound body serving as a precursor body of the spirally wound electrode body 30 was formed. Next, the spirally wound body was sandwiched between the package members 40 made of a laminated film. Outer edges of the package members 40, excluding the outer edge of one side, were bonded by thermal fusion bonding. As a result, the spirally wound body was housed in the pouch-shaped package member 40. Next, the electrolytic solution was injected from the opening of the package member 40, impregnating the separator 35. As a result, the spirally wound electrode body 30 was formed.

Finally, the opening of the package member 40 was sealed in a vacuum atmosphere by thermal fusion bonding. The entire package member 40 was then heat-pressed. As a result, a laminated-film secondary battery having a thickness of 5.2 mm, a width of 34 mm, and a height of 36 mm was formed.

Example 1-2 to 1-4

A procedure similar to that of Example 1-1 was performed, o except that the o-TP content was changed to 0.5 wt % (Example 1-2), 1 wt % (Example 1-3), or 3 wt % (Example 1-4).

Examples 1-5 to 1-8

A procedure similar to those of Examples 1-1 to 1-4 was performed, except that m-terphenyl (m-TP) was used instead of o-TP as the aromatic compound.

Examples 1-9 to 1-14

A procedure similar to that of Example 1-1 was performed, except that p-terphenyl (p-TP) was used instead of o-TP as the aromatic compound, and the content of aromatic compound was partially changed. The p-terphenyl content was 0.05 wt % in Example 1-9 and 4 wt % in Example 1-14. The p-terphenyl content in Examples 1-10 to 1-13 was the same as that in Examples 1-1 to 1-4.

Comparative Example 1-1

A procedure similar to that in Example 1-1 was performed, except that the cathode active material layer 33B did not include o-TP and the electrolytic solution did not include FEC. The composition of the solvent (EC:DEC) was a weight ratio of 50:50.

Comparative Example 1-2

A procedure similar to that in Example 1-1 was performed, except that the cathode active material layer 33B did not include o-TP.

Comparative Examples 1-3 to 1-5

A procedure similar to those in Examples 1-3, 1-7, and 1-12 was performed, except that the electrolytic solution did not include FEC. The composition of the solvent (EC:DEC) was a weight ratio of 50:50.

Comparative Example 1-6

A procedure similar to that in Comparative Example 1-2 was performed, except that p-TP was included in the electrolytic solution instead of in the cathode active material layer. The p-TP content in the electrolytic solution was 3 wt %.

When the overcharge characteristics and the storage characteristics of the secondary batteries in Examples 1-1 to 1-14 and Comparative Examples 1-1 to 1-6 were examined, results shown in Table 1 and Table 2 were obtained.

Regarding the overcharge characteristics, an outer appearance of the secondary battery during repeated charging and discharging was examined by the secondary battery being overcharged after charging and discharging had been repeated for 2 cycles or 100 cycles. The number of tests under both cycle conditions was 3 (so-called n=3). When ignition and the like (ignition and smoking) did not confirmed in all three tests, an evaluation result was good. When ignition or the like was confirmed at even one test among the three tests, the evaluation result was poor.

To examine the overcharge characteristics after two cycles, the secondary battery was overcharged after being charged and discharged for two cycles in an atmosphere of 23° C. Charging and discharging conditions of a single cycle were as follows. The secondary battery was charged to a maximum voltage of 4.2 V with a constant current of 0.2 C. The secondary battery remained charged at a constant voltage of 4.2 V for three hours. Then, the secondary battery was discharged to a final voltage of 2.5 V with a constant current of 0.2 C. "0.2 C" is a current value at which a theoretical capacity is fully discharged in five hours. Overcharging conditions were as follows. The secondary battery was charged to a maximum voltage of 12 V with a constant current of 1 C, or the secondary battery was charged with the same current until charging duration reached three hours.

To examine the overcharge characteristics after 100 cycles, the secondary battery was overcharged after being charged and discharged for 100 cycles in an atmosphere of 23° C. The charging and discharging conditions and the overcharging conditions of a single cycle were similar to those used when the overcharge characteristics after two cycles are examined.

To examine the storage characteristics, the secondary battery was stored by a following procedure and a discharge capacity retention ratio was determined. First, the secondary battery was charged and discharged for two cycles in an atmosphere of 23° C. The discharge capacity at the second cycle was measured (discharge capacity before storage). Next, after being charged again, the secondary battery was stored in a temperature-controlled bath of 58° C. for 30 days. The secondary battery was then discharged at an atmosphere of 23° C. The discharge capacity at the third cycle was measured (discharge capacity after storage). Finally, discharge capacity retention ratio (%)=(discharge capacity after storage/discharge capacity before storage)×100 was calculated.

The charging and discharging conditions for a single cycle were as follows. The secondary battery was constant-voltage and constant-current charged to a maximum voltage of 4.2 V with a charging current of 0.2 C. Then, the secondary battery was constant-current discharged to a final voltage of 2.5 V with a discharging current of 0.2 C.

The procedures, conditions, and the like for examining the overcharge characteristics and the storage characteristics are similar for the subsequent Examples and Comparative Examples.

TABLE 1

Battery structure: Laminated-type
Anode active material: Silicon (Electron beam evaporation method)

| | Cathode | | Electrolytic Solution | | | | | | Discharge |
| | Aromatic Compound | | | Solvent (wt %) | | | Aromatic Compound | | Occurrence of Ignition, etc. | | Capacity Retention |
| | Type | wt % | Electrolyte Salt | EC | DEC | FEC | Type | wt % | After 2 Cycles | After 100 Cycles | Ratio (%) |
|---|---|---|---|---|---|---|---|---|---|---|---|
| Example 1-1 | o-TP | 0.1 | LiPF$_6$ | 20 | 50 | 30 | — | — | good | good | 81 |
| Example 1-2 | | 0.5 | 1 mol/kg | 20 | 50 | 30 | — | — | good | good | 81 |
| Example 1-3 | | 1 | | 20 | 50 | 30 | — | — | good | good | 80 |
| Example 1-4 | | 3 | | 20 | 50 | 30 | — | — | good | good | 80 |
| Example 1-5 | m-TP | 0.1 | LiPF$_6$ | 20 | 50 | 30 | — | — | good | good | 83 |
| Example 1-6 | | 0.5 | 1 mol/kg | 20 | 50 | 30 | — | — | good | good | 83 |
| Example 1-7 | | 1 | | 20 | 50 | 30 | — | — | good | good | 82 |
| Example 1-8 | | 3 | | 20 | 50 | 30 | — | — | good | good | 81 |
| Example 1-9 | p-TP | 0.05 | LiPF$_6$ | 20 | 50 | 30 | — | — | good | good | 78 |
| Example 1-10 | | 0.1 | 1 mol/kg | 20 | 50 | 30 | — | — | good | good | 83 |
| Example 1-11 | | 0.5 | | 20 | 50 | 30 | — | — | good | good | 82 |
| Example 1-12 | | 1 | | 20 | 50 | 30 | — | — | good | good | 82 |
| Example 1-13 | | 3 | | 20 | 50 | 30 | — | — | good | good | 81 |
| Example 1-14 | | 4 | | 20 | 50 | 30 | — | — | good | good | 76 |

TABLE 2

Battery structure: Laminated-type
Anode active material: Silicon (Electron beam evaporation method)

| | Cathode | | Electrolytic Solution | | | | | | Discharge |
| | Aromatic Compound | | | Solvent (wt %) | | | Aromatic Compound | | Occurrence of Ignition, etc. | | Capacity Retention |
| | Type | wt % | Electrolyte Salt | EC | DEC | FEC | Type | wt % | After 2 Cycles | After 100 Cycles | Ratio (%) |
|---|---|---|---|---|---|---|---|---|---|---|---|
| Comparative Example 1-1 | — | — | LiPF$_6$ 1 mol/kg | 50 | 50 | — | — | — | poor | poor | 72 |
| Comparative Example 1-2 | | | | 20 | 50 | 30 | — | — | poor | poor | 71 |
| Comparative Example 1-3 | o-TP | 1 | LiPF$_6$ 1 mol/kg | 50 | 50 | — | — | — | good | poor | 48 |
| Comparative Example 1-4 | m-TP | 1 | | 50 | 50 | — | — | — | good | poor | 49 |
| Comparative Example 1-5 | p-TP | 1 | | 50 | 50 | — | — | — | good | poor | 51 |
| Comparative Example 1-6 | — | — | LiPF$_6$ 1 mol/kg | 20 | 50 | 30 | p-TP | 3 | good | good | 66 |

As shown in Table 1 and Table 2, in Examples 1-1 to 1-4 in which the cathode active material layer 33B included o-TP, m-TP, and p-TP, and the electrolytic solution included FEC, the occurrence of ignition and the like was supressed and the discharge capacity retention ratio increased, compared to Comparative Examples 1-1 to 1-5 in which o-TP and the like, and FEC were not included together.

Specifically, in Comparative Example 1-1 that did not include o-TP and the like and also did not include FEC, and Comparative Example 1-2 that did not include o-TP but included FEC, ignition and the like occurred both after 2 cycles and after 100 cycles. The discharge capacity retention ratio was only about 70%. In Comparative Examples 1-3 to 1-5 that included o-TP and the like but did not include FEC, ignition and the like occurred after 100 cycles. At the same time, the ignition and the like after two cycles did not occur. However, the discharge capacity retention ratio significantly decreased. On the other hand, in Examples 1-1 to 1-4 that included o-TP and the like and also included FEC, regardless of difference in aromatic compound types (o-TP, m-TP, or p-TP), ignition and the like occurred neither after 2 cycles nor after 100 cycles. In addition, the discharge capacity retention ratio improved to about 80%. The results indicate that, when the cathode active material layer 33B includes o-TP and the like and the electrolytic solution includes FEC, a coating is formed on the surfaces of the cathode 33 and the anode 34. Decomposition of the electrolytic solution and aromatic compound is suppressed. Therefore, the discharge capacity becomes less likely to decrease, even after high temperature storage. Moreover, the overcharge inhibition function of the aromatic compound becomes more easily sustained, even if the battery is repeatedly charged and discharged.

When focus attention on Examples 1-9 to 1-14 in which the p-TP content in the cathode active material layer 33B was changed within a range from 0.05 wt % to 4 wt %, if the content was less that 0.1 wt % or more than 3 wt %, the discharge capacity retention ratio significantly decreased. If the content was within a range from 0.1 wt % to 3 wt %, the discharge capacity retention ratio was almost constant at about 80%. Regarding o-TP in Examples 1-1 to 1-4 and m-TP in Examples 1-5 to 1-8 as well, if the content was within a range from 0.1 wt % to 3 wt %, the discharge capacity retention ratio was almost constant at about 80%.

In Comparative Example 1-6 in which the electrolytic solution included p-TP, ignition and the like occurred neither after 2 cycles nor after 100 cycles. However, the discharge capacity retention ratio dropped to a 60% range. On the other hand, in Example 1-13 in which the cathode active material layer 33B included p-TP, as described above, ignition and the like occurred neither after 2 cycles nor after 100 cycles. The discharge capacity retention ratio also improved to about 80%. The results indicate that, to improve the discharge capacity retention ratio, the aromatic compound is preferably included in the cathode active material layer 33B rather than in the electrolytic solution.

Therefore, it was confirmed that, in the laminated-film secondary battery in which the anode active material of the anode included silicon (electron beam evaporation method), because the cathode active material layer included the aromatic compound having three benzene rings and the electrolytic solution included the ester carbonate containing a halogen, both storage characteristics and overcharge characteristics were ensured. It was also confirmed that, in that case, if the content of aromatic compound in the cathode active material layer was within the range from 0.1 wt % to 3 wt %, the storage characteristics improved.

Here, only examples in which the cyclic ester carbonate (FEC) was used as the ester carbonate containing a halogen are disclosed. Examples in which the chain ester carbonate such as fluoropropyl methyl carbonate and the like is used are not disclosed. However, as long as a halogen is included, the chain ester carbonate has the same coating formation function as the cyclic ester carbonate. Therefore, it is clear that, even if the chain ester carbonate is used, similar effects may be achieved as those achieved when the cyclic ester carbonate is used.

The following may be drawn from the results in Table 1 and Table 2. In other words, based on the results of Comparative Example 1-1 that includes neither o-TP and the like nor FEC, technical significance of the results of Examples 1-3, 1-7, and 1-12, and Comparative Examples 1-2 to 1-5 is considered. In Comparative Example 1-2 that includes only FEC, a state of the occurrence of ignition and the like was the same, and the discharge capacity retention ratio was almost the same. Therefore, it is clear that the ester carbonate containing a halogen does not contribute to prevent the occurrence of ignition and the like and contributes little to improve the discharge capacity retention ratio. In Comparative Examples 1-3 to 1-5 that include only o-TP and the like, the state of the occurrence of ignition and the like after two cycles was improved. However, the discharge capacity retention ratio significantly decreased. Therefore, it is clear that the aromatic compound contributes to prevent the occurrence of ignition and, at the same time, causes the discharge capacity retention ratio to decrease. Therefore, in terms of respective functions unique to the aromatic compound and to the ester carbonate containing a halogen, the occurrence of ignition and the like should be prevented and, at the same time, a sufficient discharge capacity retention ratio should not be achieved simply by the aromatic compound and the ester carbonate containing the halogen being combined. However, in Examples 1-3, 1-7, and 1-12 that included o-TP and the like and FEC together, the state of the occurrence of ignition and the like was improved not only after 2 cycles, but also after 100 cycles. Moreover, the discharge capacity retention ratio was higher than in Comparative Examples 1-1 and 1-2. The results indicate that a synergistic effect is achieved that is not achieved through individual use of the aromatic compound and the ester carbonate containing a halogen. As a result of the synergistic effect, a function for preventing the occurrence of ignition and the like (overcharge inhibition function) is sustained even if the battery is repeatedly charged and discharged. Moreover, the discharge capacity is significantly less likely to decrease even after high temperature storage.

Examples 2-1 to 2-6

A procedure similar to those in Examples 1-9 to 1-14 was performed, except that quaterphenyl (QP) was used instead of p-TP as the aromatic compound.

Examples 2-7 to 2-10

A procedure similar to those in Examples 2-2 to 2-5 was performed, except that 4,5-difluoro-1,3-dioxolane-2-one (DFEC) was used instead of FEC as the ester carbonate containing a halogen and the composition of the solvent was changed. The composition of the solvent (EC:DEC:DFEC) was a weight ratio of 30:50:20.

Examples 2-11 to 2-14

A procedure similar to those in Examples 2-2 to 2-5 was performed, except that vinylene carbonate (VC) that is an ester carbonate containing an unsaturated bond was used instead of the ester carbonate containing a halogen (FEC) and the composition of the solvent was changed. The composition of the solvent (EC:DEC:VC) was a weight ratio of 30:67:3.

Example 2-15

A procedure similar to that in Example 2-4 was performed, except that VC was added and the composition of the solvent was changed. The composition of the solvent (EC:DEC:FEC:VC) was a weight ratio of 20:50:27:3.

Comparative Examples 2-1 and 2-2

A procedure similar to those in Examples 2-7 to 2-10 or Examples 2-11 to Example 2-14 was performed, except that QP was not included in the cathode active material layer 33B.

Comparative Examples 2-3 to 2-6

A procedure similar to those in Examples 2-2 to 2-5 was performed, except that DFEC was not included in the solvent. The composition of the solvent (EC:DEC) was a weight ratio of 50:50.

When the overcharge characteristics and the storage characteristics of the secondary batteries in Examples 2-1 to 2-15 and Comparative Examples 2-1 and 2-6 were examined, results shown in Table 3 and Table 4 were obtained. In Table 4, various characteristics of Comparative Examples 1-1 and 1-2 are also shown.

TABLE 3

Battery structure: Laminated-type
Anode active material: Silicon (Electron beam evaporation method)

| | Cathode Aromatic Compound | | | Electrolytic Solution | | | | | | Occurrence of Ignition, etc. | | Discharge Capacity Retention Ratio (%) |
|---|---|---|---|---|---|---|---|---|---|---|---|---|
| | Type | wt % | Electrolyte Salt | EC | DEC | FEC | DFEC | VC | | After 2 Cycles | After 100 Cycles | |
| Example 2-1 | QP | 0.05 | LiPF$_6$ | 20 | 50 | 30 | — | — | | good | good | 81 |
| Example 2-2 | | 0.1 | 1 mol/kg | 20 | 50 | 30 | — | — | | good | good | 86 |
| Example 2-3 | | 0.5 | | 20 | 50 | 30 | — | — | | good | good | 85 |
| Example 2-4 | | 1 | | 20 | 50 | 30 | — | — | | good | good | 85 |
| Example 2-5 | | 3 | | 20 | 50 | 30 | — | — | | good | good | 85 |
| Example 2-6 | | 4 | | 20 | 50 | 30 | — | — | | good | good | 82 |
| Example 2-7 | QP | 0.1 | LiPF$_6$ | 30 | 50 | — | 20 | — | | good | good | 87 |
| Example 2-8 | | 0.5 | 1 mol/kg | 30 | 50 | — | 20 | — | | good | good | 87 |
| Example 2-9 | | 1 | | 30 | 50 | — | 20 | — | | good | good | 86 |
| Example 2-10 | | 3 | | 30 | 50 | — | 20 | — | | good | good | 85 |
| Example 2-11 | QP | 0.1 | LiPF$_6$ | 30 | 67 | — | — | 3 | | good | good | 83 |
| Example 2-12 | | 0.5 | 1 mol/kg | 30 | 67 | — | — | 3 | | good | good | 84 |
| Example 2-13 | | 1 | | 30 | 67 | — | — | 3 | | good | good | 84 |
| Example 2-14 | | 3 | | 30 | 67 | — | — | 3 | | good | good | 82 |
| Example 2-15 | QP | 1 | LiPF$_6$ 1 mol/kg | 20 | 50 | 27 | — | 3 | | good | good | 85 |

TABLE 4

Battery structure: Laminated-type
Anode active material: Silicon (Electron beam evaporation method)

| | Cathode Aromatic Compound | | | Electrolytic Solution | | | | | | Occurrence of Ignition, etc. | | Discharge Capacity Retention Ratio (%) |
|---|---|---|---|---|---|---|---|---|---|---|---|---|
| | Type | wt % | Electrolyte Salt | EC | DEC | FEC | DFEC | VC | | After 2 Cycles | After 100 Cycles | |
| Comparative Example 1-1 | — | — | LiPF$_6$ 1 mol/kg | 50 | 50 | — | — | — | | poor | poor | 72 |
| Comparative Example 1-2 | | | | 20 | 50 | 30 | — | — | | poor | poor | 71 |
| Comparative Example 2-1 | | | | 30 | 50 | — | 20 | — | | poor | poor | 72 |
| Comparative Example 2-2 | | | | 30 | 67 | — | — | 3 | | poor | poor | 69 |
| Comparative Example 2-3 | QP | 0.1 | LiPF$_6$ 1 mol/kg | 50 | 50 | — | — | — | | good | poor | 65 |
| Comparative Example 2-4 | | 0.5 | | 50 | 50 | — | — | — | | good | poor | 62 |
| Comparative Example 2-5 | | 1 | | 50 | 50 | — | — | — | | good | poor | 59 |
| Comparative Example 2-6 | | 2 | | 50 | 50 | — | — | — | | good | poor | 57 |

As shown in Table 3 and Table 4, results similar to those in Table 1 and Table 2 were seen even when QP was used as the aromatic compound, and FEC or DFEC was used as the ester carbonate containing a halogen or VC was used the ester carbonate containing an unsaturated bond. In other words, in Examples 2-1 to 2-14 in which the cathode active material layer 33B included QP and the electrolytic solution included FEC, DFEC, or VC, regardless of whether FED, DFEC, or VC was used, the occurrence of ignition and the like was suppressed and the discharge capacity retention ratio increased, compared to Comparative Examples 1-1, 1-2, and 2-1 to 2-6 in which QP and FEC and the like were not included together. In Examples 2-1 to 2-6, if the QP content became less than 0.1 wt % or more than 3 wt %, the discharge capacity retention ratio tended to decrease significantly.

Even when QP was used as the aromatic compound and FEC as the ester carbonate containing a halogen and VC as the ester carbonate containing an unsaturated bond was mixed and used, effects similar to when QP was used and FEC or VC was used was achieved. Specifically, in Example 2-15 in which the cathode active material layer 33B included QP and the electrolytic solution included FEC and VC, the ignition and the like occurred neither after 2 cycles nor after 100 cycles. Furthermore, the discharge capacity retention ratio was 80% or more.

Therefore, it was confirmed that, in the laminated-film secondary battery in which the anode active material of the anode included silicon (electron beam evaporation method), because the cathode active material layer included an aromatic compound having four benzene rings and the electrolytic solution included at least one type selected from the group consisting of the ester carbonate containing a halogen and the ester carbonate containing an unsaturated bond, both storage characteristics and overcharge characteristics were ensured. It was also confirmed that, when the content of aromatic compound in the cathode active material layer was within the range from 0.1 wt % to 3 wt %, the storage characteristics improved.

An attempt to include QP in the electrolytic solution, similar to Comparative Example 1-6 including p-TP in the electrolytic solution, was made. However, QP did not dissolve in the solvent of the electrolytic solution, nor did QP dissolve when heated.

Examples 3-1 to 3-4

A procedure similar to those in Examples 2-2 to 2-5 was performed, except that the anode active material layer 34B was formed by sintering method and the composition of the solvent was changed. When the anode active material layer 34B was formed, 80 parts by weight of silicon powder serving as an anode active material and 20 parts by weight of polyimide serving as a binder were mixed, forming an anode mixture. The anode mixture was then dispersed in N-methyl-2-pyrrolidone to obtain anode mixture slurry. Both sides of the anode current collector 34A was coated with the anode mixture slurry. The anode mixture was then dried and compression-molded. Next, the anode current collector 34A was heated at 400° C. for 12 hours in a vacuum atmosphere. The composition of the solvent (EC:DEC:FEC) was a weight ratio of 10:50:40.

Example 3-5

A procedure similar to that in Example 2-12 was performed, except that the anode active material layer 34B was formed by the sintering method as in Examples 3-1 to 3-4.

Comparative Examples 3-1 and 3-2

A procedure similar to those in Examples 3-1 to 3-4 or Example 3-5 was performed, except that the cathode active material layer 33B did not include QP.

Comparative Example 3-3 to 3-6

A procedure similar to those in Examples 3-1 to 3-4 was performed, except that the electrolytic solution did not include FEC. The composition of the solvent (EC:DEC) was a weight ration of 40:60.

When the overcharge characteristics and the storage characteristics of the secondary batteries in Examples 3-1 to 3-5 and Comparative Examples 3-1 to 3-6 were examined, results shown in Table 5 were obtained.

TABLE 5

Battery structure: Laminated-type
Anode active material: Silicon (Sintering method)

| | Cathode Aromatic Compound | | | Electrolytic Solution | | | | | Occurrence of Ignition, etc. | | Discharge Capacity retention ratio (%) |
|---|---|---|---|---|---|---|---|---|---|---|---|
| | Type | wt % | Electrolyte Salt | EC | DEC | FEC | VC | | After 2 Cycles | After 100 Cycles | |
| Example 3-1 | QP | 0.1 | LiPF$_6$ | 10 | 50 | 40 | — | | good | good | 87 |
| Example 3-2 | | 0.5 | 1 mol/kg | 10 | 50 | 40 | — | | good | good | 86 |
| Example 3-3 | | 1 | | 10 | 50 | 40 | — | | good | good | 86 |
| Example 3-4 | | 3 | | 10 | 50 | 40 | — | | good | good | 85 |
| Example 3-5 | QP | 0.5 | LiPF$_6$ 1 mol/kg | 30 | 67 | — | 3 | | good | good | 83 |
| Comparative Example 3-1 | — | — | LiPF$_6$ 1 mol/kg | 10 | 50 | 40 | — | | poor | poor | 71 |
| Comparative Example 3-2 | | | | 30 | 67 | — | 3 | | poor | poor | 68 |
| Comparative Example 3-3 | QP | 0.1 | LiPF$_6$ 1 mol/kg | 40 | 60 | — | — | | good | poor | 64 |
| Comparative Example 3-4 | | 0.5 | | 40 | 60 | — | — | | good | poor | 62 |
| Comparative Example 3-5 | | 1 | | 40 | 60 | — | — | | good | poor | 60 |
| Comparative Example 3-6 | | 3 | | 40 | 60 | — | — | | good | poor | 58 |

As shown in Table 5, results similar to the results shown in Table 3 and Table 4 were obtained even when the anode active material layer 34B was formed by the sintering method. In other words, in Examples 3-1 to 3-5 in which the cathode active material layer 33B included QP and the electrolytic solution included FEC or VC, the occurrence of ignition and the like was suppressed and the discharge capacity retention ratio increased compared to Comparative Examples 3-1 to 3-6 in which QP and FEC and the like were not included together. Therefore, it was confirmed that, in the laminated-film secondary battery in which the anode active material of the anode included silicon (sintering method), because the cathode active material layer included the aromatic compound having four benzene rings and the electrolytic solution included either the ester carbonate containing a halogen or the ester carbonate containing an unsaturated bond, the storage characteristics and the overcharge characteristics were ensured.

Examples 4-1 to 4-14

A cylindrical secondary battery shown in FIG. 1 and FIG. 2 was fabricated using artificial graphite as the anode material instead of silicon. When the secondary battery was fabricated, first, in adherence to a procedure similar to those in Examples 1-1 to 1-14, the cathode 21 was formed such that the cathode active material layer 21B included the aromatic compound (o-TP, m-TP, or p-TP). The anode 22 was then formed. When the anode 22 was formed, 90 parts by weight of graphite powder serving as an anode active material and 20 parts by weight of polyvinylidene fluoride serving as a binder were mixed, forming an anode mixture. The anode mixture was then dispersed in N-methyl-2-pyrrolidone to obtain paste-like anode mixture slurry. The anode current collector 22A made of a strip-shaped copper foil (thickness of 15 μm) was evenly coated with the anode mixture slurry. The anode mixture slurry was then dried and compression-molded. As a result, the anode active material layer 22B was formed. The anode lead 26 was then attached to one end of the anode current collector 22A.

Next, the separator 23 made from microporous polypropylene film (thickness of 20 μm) was prepared. After the anode 22, the separator 23, the cathode 21, and the separator 23 were sequentially layered, the laminated body was spirally wound many times, thereby forming the spirally wound electrode body 20. Next, the spirally wound electrode body 20 was sandwiched between a pair of insulating plates 12 and 13. The anode lead 26 was welded onto the battery can 11. The cathode lead 25 was welded onto the safety valve mechanism 15. The spirally wound electrode body 20 was then housed in the battery can 11 made of nickel-plated iron. Finally, the prepared electrolytic solution was injected into the battery can 11 using a decompression method. As a result, a cylindrical secondary battery having a diameter of 18 mm and a height of 65 mm was formed.

When the electrolytic solution was prepared, after EC, propylene carbonate (PC), dimethyl carbonate (DMC), and FEC were mixed, LIPF$_6$ serving as the electrolytic salt was dissolved in the mixture. The composition of the solvent (EC:PC:DMC:FEC) was a weight ratio of 20:5:70:5. The concentration of LiPF$_6$ in the electrolytic solution was 1 mol/kg.

Comparative Example 4-1

A procedure similar to that in Example 4-1 was performed, except that the cathode active material layer 21B did not include o-TP and the electrolytic solution did not include FEC. The composition of the solvent (EC:PC:DMC) was a weight ratio of 25:5:70.

Comparative Example 4-2

A procedure similar to that in Example 4-1 was performed, except that the cathode active material layer 21B did not include o-TP.

Comparative Examples 4-3 to 4-5

A procedure similar to those in Examples 4-3, 4-7, and 4-12 was performed, except that the electrolytic solution did not include FEC. The composition of the solvent (EC:PC:DMC) was a weight ratio of 25:5:70.

Comparative Example 4-6

A procedure similar to that in Comparative Example 4-2 was performed, except that p-TP was included in the electrolytic solution instead of the cathode active material layer. The p-TP content in the electrolytic solution was 3 wt %.

When the overcharge characteristics and the storage characteristics of the secondary batteries in Examples 4-1 to 4-14 and Comparative Examples 4-1 to 4-6 were examined, results shown in Table 6 and Table 7 were obtained.

TABLE 6

Battery structure: Cylindrical-type
Anode active material: Artificial graphite

| | Cathode | | | Electrolytic Solution | | | | | | | Discharge |
| | Aromatic Compound | | | Solvent (wt %) | | | | Aromatic Compound | | Occurrence of Ignition, etc. | Capacity Retention |
| | Type | wt % | Electrolyte Salt | EC | PC | DMC | FEC | Type | wt % | After 2 Cycles | After 100 Cycles | Ratio (%) |
|---|---|---|---|---|---|---|---|---|---|---|---|---|
| Example 4-1 | o-TP | 0.1 | LiPF$_6$ | 20 | 5 | 70 | 5 | — | — | good | good | 89 |
| Example 4-2 | | 0.5 | 1 mol/kg | 20 | 5 | 70 | 5 | — | — | good | good | 88 |
| Example 4-3 | | 1 | | 20 | 5 | 70 | 5 | — | — | good | good | 88 |
| Example 4-4 | | 3 | | 20 | 5 | 70 | 5 | — | — | good | good | 86 |
| Example 4-5 | m-TP | 0.1 | LiPF$_6$ | 20 | 5 | 70 | 5 | — | — | good | good | 90 |
| Example 4-6 | | 0.5 | 1 mol/kg | 20 | 5 | 70 | 5 | — | — | good | good | 89 |
| Example 4-7 | | 1 | | 20 | 5 | 70 | 5 | — | — | good | good | 88 |
| Example 4-8 | | 3 | | 20 | 5 | 70 | 5 | — | — | good | good | 87 |
| Example 4-9 | p-TP | 0.05 | LiPF$_6$ | 20 | 5 | 70 | 5 | — | — | good | good | 89 |
| Example 4-10 | | 0.1 | 1 mol/kg | 20 | 5 | 70 | 5 | — | — | good | good | 90 |
| Example 4-11 | | 0.5 | | 20 | 5 | 70 | 5 | — | — | good | good | 89 |
| Example 4-12 | | 1 | | 20 | 5 | 70 | 5 | — | — | good | good | 89 |
| Example 4-13 | | 3 | | 20 | 5 | 70 | 5 | — | — | good | good | 87 |
| Example 4-14 | | 4 | | 20 | 5 | 70 | 5 | — | — | good | good | 85 |

TABLE 7

Battery structure: Cylindrical-type
Anode active material: Artificial graphite

| | Cathode | | | Electrolytic Solution | | | | | | | Discharge |
| | Aromatic Compound | | | | Solvent (wt %) | | | Aromatic Compound | | Occurrence of Ignition, etc. | | Capacity Retention |
| | Type | wt % | Electrolyte Salt | EC | PC | DMC | FEC | Type | wt % | After 2 Cycles | After 100 Cycles | Ratio (%) |
|---|---|---|---|---|---|---|---|---|---|---|---|---|
| Comparative Example 4-1 | — | — | LiPF$_6$ 1 mol/kg | 25 | 5 | 70 | — | — | — | poor | poor | 89 |
| Comparative Example 4-2 | | | | 20 | 5 | 70 | 5 | — | — | x | x | 89 |
| Comparative Example 4-3 | o-TP | 1 | LiPF$_6$ 1 mol/kg | 25 | 5 | 70 | — | — | — | good | x | 77 |
| Comparative Example 4-4 | m-TP | 1 | | 25 | 5 | 70 | — | — | — | good | x | 80 |
| Comparative Example 4-5 | p-TP | 1 | | 25 | 5 | 70 | — | — | — | good | x | 82 |
| Comparative Example 4-6 | — | — | LiPF$_6$ 1 mol/kg | 20 | 5 | 70 | 5 | p-TP | 3 | good | good | 81 |

As shown in Table 6 and Table 7, results similar to those shown in Table 1 and Table 2 were seen, even the anode active material layer 22B was formed using graphite as the anode active material and the structure of the battery was cylindrical type. In other words, in Examples 4-1 to 4-14 in which the cathode material layer 21B included o-TP, m-TP, or p-TP, and the electrolytic solution included FEC, the occurrence of ignition and the like was suppressed and the discharge capacity retention ratio was increased, compared to Comparative Examples 4-1 to 4-5 in which o-TP and the like and FEC were not included together. In that case, a significantly high discharge capacity retention ratio of about 90% was achieved. In Example 4-13 in which the cathode active material layer 21B included p-TP, the occurrence of ignition and the like was suppressed and the discharge capacity retention ratio was increased, compared to Comparative Example 4-6 in which the electrode included p-TP. Therefore, it was confirmed that, in the cylindrical secondary battery in which the anode active material layer of the anode included artificial graphite, because the cathode active material layer included the aromatic compound having three benzene rings and the electrolytic solution included the ester carbonate containing a halogen, the storage characteristics and overcharge characteristics were secured.

Examples 5-1 to 5-4

A procedure similar to those in Examples 4-1 to 4-4 was performed, except that QP was used instead of o-TP as the aromatic compound. The composition of the solvent (EC:PC:DMC:FEC) was a weight ratio of 24:5:70:1.

Examples 5-5 to 5-10

A procedure similar to those in Examples 4-9 to 4-14 was performed, except that QP was used instead of p-TP as the aromatic compound.

Examples 5-11 to 5-14

A procedure similar to those in Examples 5-1 to 5-4 was performed, except that the composition of the solvent was changed. The composition of the solvent (EC:PC:DMC:FEC) was a weight ratio of 15:5:70:10.

Examples 5-15 to 5-18

A procedure similar to those in Examples 5-1 to 5-4 was performed, except that the composition of the solvent was changed. The composition of the solvent (EC:PC:DMC:FEC) was a weight ratio of 5:5:70:20.

Comparative Examples 5-1 to 5-4

A procedure similar to those in Examples 5-1 to 5-4 was performed, except that the solvent did not include FEC. The composition of the solvent (EC:PC:DMC) was a weight ratio of 25:5:70.

When the overcharge characteristics and the storage characteristics of the secondary batteries in Examples 5-1 to 5-18 and Comparative Examples 5-1 to 5-4 were examined, results shown in Table 8 and Table 9 were obtained. In Table 9, various characteristics of Comparative Examples 4-1 and 4-2 are also shown.

TABLE 8

Battery structure: Cylindrical-type
Anode active material: Artificial graphite

| | Cathode Aromatic Compound | | | Electrolytic Solution | | | | | Occurrence of Ignition, etc. | | Discharge Capacity Retention |
| | | | | | Solvent (wt %) | | | | | | |
| | Type | wt % | Electrolyte Salt | EC | PC | DMC | FEC | | After 2 Cycles | After 100 Cycles | Ratio (%) |
|---|---|---|---|---|---|---|---|---|---|---|---|
| Example 5-1 | QP | 0.1 | LiPF$_6$ | 24 | 5 | 70 | 1 | | good | good | 91 |
| Example 5-2 | | 0.5 | 1 mol/kg | 24 | 5 | 70 | 1 | | good | good | 91 |
| Example 5-3 | | 1 | | 24 | 5 | 70 | 1 | | good | good | 90 |

TABLE 8-continued

Battery structure: Cylindrical-type
Anode active material: Artificial graphite

| | Cathode Aromatic Compound | | Electrolytic Solution | | | | | Occurrence of Ignition, etc. | | Discharge Capacity Retention Ratio (%) |
|---|---|---|---|---|---|---|---|---|---|---|
| | Type | wt % | Electrolyte Salt | EC | PC | DMC | FEC | After 2 Cycles | After 100 Cycles | |
| Example 5-4 | | 3 | | 24 | 5 | 70 | 1 | good | good | 90 |
| Example 5-5 | QP | 0.05 | LiPF$_6$ | 20 | 5 | 70 | 5 | good | good | 90 |
| Example 5-6 | | 0.1 | 1 mol/kg | 20 | 5 | 70 | 5 | good | good | 92 |
| Example 5-7 | | 0.5 | | 20 | 5 | 70 | 5 | good | good | 92 |
| Example 5-8 | | 1 | | 20 | 5 | 70 | 5 | good | good | 92 |
| Example 5-9 | | 3 | | 20 | 5 | 70 | 5 | good | good | 91 |
| Example 5-10 | | 4 | | 20 | 5 | 70 | 5 | good | good | 90 |
| Example 5-11 | QP | 0.1 | LiPF$_6$ | 15 | 5 | 70 | 10 | good | good | 91 |
| Example 5-12 | | 0.5 | 1 mol/kg | 15 | 5 | 70 | 10 | good | good | 91 |
| Example 5-13 | | 1 | | 15 | 5 | 70 | 10 | good | good | 91 |
| Example 5-14 | | 3 | | 15 | 5 | 70 | 10 | good | good | 90 |
| Example 5-15 | QP | 0.1 | LiPF$_6$ | 5 | 5 | 70 | 20 | good | good | 90 |
| Example 5-16 | | 0.5 | 1 mol/kg | 5 | 5 | 70 | 20 | good | good | 90 |
| Example 5-17 | | 1 | | 5 | 5 | 70 | 20 | good | good | 89 |
| Example 5-18 | | 3 | | 5 | 5 | 70 | 20 | good | good | 89 |

TABLE 9

Battery structure: Cylindrical-type
Anode active material: Artificial graphite

| | Cathode Aromatic Compound | | Electrolytic Solution | | | | | Occurrence of Ignition, etc. | | Discharge Capacity Retention Ratio (%) |
|---|---|---|---|---|---|---|---|---|---|---|
| | Type | wt % | Electrolyte Salt | EC | PC | DMC | FEC | After 2 Cycles | After 100 Cycles | |
| Comparative Example 4-1 | — | — | LiPF$_6$ 1 mol/kg | 25 | 5 | 70 | — | poor | poor | 89 |
| Comparative Example 4-2 | | | | 20 | 5 | 70 | 5 | poor | poor | 89 |
| Comparative Example 5-1 | QP | 0.1 | LiPF$_6$ 1 mol/kg | 25 | 5 | 70 | — | good | poor | 89 |
| Comparative Example 5-2 | | 0.5 | | 25 | 5 | 70 | — | good | poor | 88 |
| Comparative Example 5-3 | | 1 | | 25 | 5 | 70 | — | good | poor | 88 |
| Comparative Example 5-4 | | 3 | | 25 | 5 | 70 | — | good | poor | 87 |

As shown in Table 8 and Table 9, results that are similar to those in Table 6 and Table 7 were seen even when QP is used as the aromatic compound and the content of FEC was changed. In other words, in Examples 5-1 to 5-18 in which the cathode active material layer 21B included QP and the electrolytic solution included FEC, the occurrence of ignition and like was suppressed and the discharge capacity retention ratio was increased, compared to the Comparative Examples 4-1, 4-2, and 5-1 to 5-4 in which QP and FEC were not included together. Therefore, it was confirmed that, in the cylindrical secondary battery in which the anode active material layer included graphite, because the cathode active material layer included the aromatic compound having four benzene rings and the electrolytic solution included the ester carbonate containing a halogen, the storage characteristics and the overcharge characteristics were ensured.

Examples 6-1 to 6-4

A procedure similar to those in Examples 5-6 to 5-9 was performed, except that DFEC was used instead of FEC as the ester carbonate containing a halogen.

Examples 6-5 to 6-8

A procedure similar to those in Examples 5-5 to 5-9 was performed, except that VC that is the ester carbonate containing an unsaturated bond was used instead of the ester carbonate containing a halogen (FEC) and the composition of the solvent was changed. The composition of the solvent (EC:PC:DMC:VC) was a weight ratio of 23:5:70:2.

Example 6-9

A procedure similar to that in Example 5-8 was performed, except that VC was added and the composition of the solvent was changed. The composition of the solvent (EC:PC:DMC:FEC:VC) was a weight ratio of 20:5:67:5:3

Comparative Examples 6-1 and 6-2

A procedure similar to those in Examples 6-1 to 6-4 or Examples 6-5 to 6-8 was performed, except that the cathode active material layer 21B did not include QP.

When the overcharge characteristics and the storage characteristics of the secondary batteries in Examples 6-1 to 6-9 and Comparative Examples 6-1 and 6-2 were examined, results shown in Table 10 were obtained. In Table 10, various characteristics of Example 5-8, Comparative Example 4-1, and Comparative Examples 5-1 to 5-4 are also shown.

anode active material layer, and the battery structure, because the cathode active material layer included the aromatic compound having three or more benzene rings and the electrolytic solution included at least one of the ester carbonate containing a halogen and the ester carbonate containing an unsaturated bond. In particular, it was found out that more favorable

TABLE 10

Battery structure: Cylindrical-type
Anode active material: Artificial graphite

| | Cathode Aromatic Compound | | Electrolytic Solution | | | | | | | Occurrence of Ignition, etc. | | Discharge Capacity Retention Ratio (%) |
|---|---|---|---|---|---|---|---|---|---|---|---|---|
| | | | | Solvent (wt %) | | | | | | | | |
| | Type | wt % | Electrolyte Salt | EC | PC | DMC | FEC | DFEC | VC | After 2 Cycles | After 100 Cycles | |
| Example 6-1 | QP | 0.1 | LiPF$_6$ | 20 | 5 | 70 | — | 5 | — | good | good | 93 |
| Example 6-2 | | 0.5 | 1 mol/kg | 20 | 5 | 70 | — | 5 | — | good | good | 92 |
| Example 6-3 | | 1 | | 20 | 5 | 70 | — | 5 | — | good | good | 92 |
| Example 6-4 | | 3 | | 20 | 5 | 70 | — | 5 | — | good | good | 92 |
| Example 6-5 | QP | 0.1 | LiPF$_6$ | 23 | 5 | 70 | — | — | 2 | good | good | 93 |
| Example 6-6 | | 0.5 | 1 mol/kg | 23 | 5 | 70 | — | — | 2 | good | good | 93 |
| Example 6-7 | | 1 | | 23 | 5 | 70 | — | — | 2 | good | good | 93 |
| Example 6-8 | | 3 | | 23 | 5 | 70 | — | — | 2 | good | good | 92 |
| Example 5-8 | QP | 1 | LiPF$_6$ | 20 | 5 | 70 | 5 | — | — | good | good | 92 |
| Example 6-9 | | | 1 mol/kg | 20 | 5 | 67 | 5 | — | 3 | good | good | 92 |
| Example 4-1 | — | — | LiPF$_6$ | 25 | 5 | 70 | — | — | — | poor | poor | 89 |
| Example 6-1 | | | 1 mol/kg | 20 | 5 | 70 | — | 5 | — | poor | poor | 90 |
| Example 6-2 | | | | 23 | 5 | 70 | — | — | 2 | poor | poor | 90 |
| Example 5-1 | QP | 0.1 | LiPF$_6$ | 25 | 5 | 70 | — | — | — | good | poor | 89 |
| Example 5-2 | | 0.5 | 1 mol/kg | 25 | 5 | 70 | — | — | — | good | poor | 88 |
| Example 5-3 | | 1 | | 25 | 5 | 70 | — | — | — | good | poor | 88 |
| Example 5-4 | | 3 | | 25 | 5 | 70 | — | — | — | good | poor | 87 |

As shown in Table 10, results that are similar to those shown in Table 8 and Table 9 were seen when DFEC was used as the ester carbonate containing a halogen or VC was used as the ester carbonate containing an unsaturated bond. In other words, in Examples 6-1 to 6-8 in which the cathode active material layer 21B included QP and the electrolytic solution included DFEC or VC, the occurrence of ignition and the like was suppressed and the discharge capacity retention ratio decreased, compared to Comparative Examples 4-1, 5-1 to 5-4, 6-1, and 6-2 that did not include QP and DFEC and the like together.

Effects similar to those when QP was used and FEC or VC was used were achieved even when QP was used as the aromatic compound and FEC as the ester carbonate containing a halogen and VC as the ester carbonate containing an unsaturated bond were used in combination. Specifically, in Example 6-9 in which the cathode active material layer 21B included QP and the electrolytic solution included FEC and VC, ignition and the like occurred neither after 2 cycles nor after 100 cycles. The discharge capacity retention ratio was also 90% or more.

Therefore, it was confirmed that, in the cylindrical secondary battery in which the anode active material of the anode included graphite, because the cathode active material layer included the aromatic compound having four benzene rings and the electrolytic solution included at least one type selected from the group consisting of the ester compound containing a halogen and the ester compound containing an unsaturated bond, the storage characteristics and the overcharge characteristics were ensured.

From the above-described results in Table 1 to Table 10, it was confirmed that the storage characteristics and the overcharge characteristics were ensured regardless of the material used as the anode active material, the formation method of the effects were achieved when silicon allowing high energy density to be achieved was used as the anode active material, because a rate of increase in the discharge capacity retention ratio increased. It is thought that, in the result, a decomposition suppressing effect of the electrolytic solution was remarkably displayed because decomposition reaction of the electrolytic solution occurs more easily through use of silicon that achieves high energy density as the anode active material, compared to the case that a carbon material is used.

The invention has been described with reference to the embodiments and the examples. However, the invention is not limited to the aspects described in the foregoing embodiments and examples, and various modifications may be made. For example, in the foregoing embodiments and examples, in the case where the electrolytic solution or the gel electrolyte in which a polymer compound holds the electrolytic solution is used as the electrolyte of the battery is described. However, other types of electrolytes may also be used, such as: an electrolyte that is a mixture of an ion-conductive inorganic compound, such as ion-conductive ceramics, ion-conductive glass, or ion-conductive crystal, and the electrolytic solution; an electrolyte that is a mixture of another inorganic compound and the electrolytic solution; and an electrolyte that is a mixture of the inorganic compound and the gel electrolyte.

In the foregoing embodiments and examples, as the battery type, the lithium ion secondary battery in which the capacity of the anode is expressed based on insertion and extraction of lithium and the lithium metal secondary battery in which the capacity of the anode is expressed based on deposition and dissolution of lithium are described. However, the battery type is not necessarily limited thereto. The battery of the invention is similarly applicable to a secondary battery in which, by making the charge capacity of the anode material capable of inserting and extracting lithium smaller than the charge capacity of the cathode, the capacity of the anode includes the capacity based on insertion and extraction of lithium and deposition and dissolution of lithium. Moreover, the capacity of the anode is expressed by a sum of the capacities.

In the foregoing embodiments and examples, the case where the battery structure is the cylindrical type and the laminated-film type and the case where the battery elements have a spirally-wound structure are described as examples. However, the battery of the invention is similarly applicable to the case where the battery has another battery structure, such as square-shaped, coin-shaped or button-shaped, or the case where the battery elements have another structure such as a layered structure. The battery of the invention is not limited to secondary batteries and is similarly applicable other types of batteries, such as a primary battery.

In the foregoing embodiments and examples, the case where lithium is used as the electrode reactant is described. However, as an electrode reactant, other Group 1A element such as sodium (Na) and potassium (K), a Group 2A element such as magnesium (Mg) and calcium (Ca), or other light metal such as aluminum may be used. In these cases, the anode material described in the foregoing embodiment may be used as an anode active material as well.

In the foregoing embodiments and examples, regarding the content of aromatic compound in the cathode active material layer, numerical values derived from the results of the Examples were explained as appropriate ranges. However, the explanation does not completely deny the possibility that the content may be out of the stated ranges. In other words, the appropriate ranges described above are merely ranges particularly preferable for achieving the effects of the invention. As long as the effects of the invention are achieved, the content may be slightly out of the range.

It should be understood by those skilled in the art that various modifications, combinations, sub-combinations and alternations may occur depending on design requirements and other factors insofar as they are within the scope of the appended claims or the equivalents thereof.

What is claimed is:

1. A battery comprising:
   a cathode;
   an anode;
   and an electrolytic solution,
   wherein,
   the cathode has a cathode current collector and a cathode active material layer provided on the cathode current collector,
   the cathode active material layer includes an aromatic compound having three or four benzene rings spaced apart from each other and bonded, and the cathode active material layer is in contact with the electrolytic solution,
   the electrolytic solution includes at least one of vinylene carbonate and an ester carbonate containing fluorine,
   the content of aromatic compound in the cathode active material layer is within a range from 0.1 wt % to 3 wt % of the cathode active material layer, and
   the anode includes an anode active material including at least one kind selected from the group consisting of a simple substance of silicon, an alloy of silicon, and a compound of silicon and a simple substance of tin, an alloy of tin, and a compound of tin.

2. The battery according to claim 1, wherein the ester carbonate containing fluorine is at least one of 4-fluoro-1,3-dioxolane-2-one and 4,5-difluoro-1,3dioxolane-2-one.

3. The battery according to claim 1, wherein the aromatic compound is at least one terphenyl and quaterphenyl.

4. The battery according to claim 1, wherein the anode includes an anode active material including a material having at least one of carbon materials, lithium metals, or metals and metalloids as an element.

5. The battery according to claim 1, wherein the ester carbonate containing fluorine is fluoroethylene carbonate (FEC) and the weight percent of the FEC is between 1 and 40 weight percent.

6. The battery according to claim 1, wherein the amount of vinylene carbonate in the electrolytic solution is 3 weight percent or the amount of ester carbonate containing a fluorine in the electrolytic solution is 20 weight percent 4,5-difluoro-1,3-dioxolane-2-one (DFEC).

* * * * *